United States Patent
Streitenberger et al.

(12)
(10) Patent No.: US 6,272,582 B1
(45) Date of Patent: Aug. 7, 2001

(54) PCI-PCI BRIDGE ALLOWING CONTROLLING OF A PLURALITY OF PCI AGENTS INCLUDING A VGA DEVICE

(75) Inventors: Robert Streitenberger; Hiroyuki Kawai, both of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/140,317

(22) Filed: Aug. 26, 1998

(30) Foreign Application Priority Data

Feb. 20, 1998  (JP) .................................................. 10-038841

(51) Int. Cl.[7] ...................................................... G06F 13/00
(52) U.S. Cl. ........................... 710/129; 710/132; 710/131; 710/8
(58) Field of Search ..................................... 710/132, 131, 710/129, 128, 126, 104, 3, 8, 10

(56) References Cited

U.S. PATENT DOCUMENTS 5,542,055  *  7/1996  Amini et al. .......................... 710/101
5,878,237  *  3/1999  Olarig ................................... 710/128
5,996,034  * 11/1999  Carter ................................... 710/100

FOREIGN PATENT DOCUMENTS 9-237246   9/1997  (JP) .

OTHER PUBLICATIONS

PCI–PCI Bridge Spec., Revision 1.0, Apr. 5, 1994 pp. 8–10.*

Rembold et al., Interface–Technologie für Prozeβ–und Mikrorechner, München: R. Oldenbourg Verlag, 1981, ISBN: 3–486–25081–7, pp. 238 to 239.

* cited by examiner

*Primary Examiner*—Ario Etienne
(74) *Attorney, Agent, or Firm*—McDermott, Will & Emery

(57) ABSTRACT

A PCI-PCI bridge is connected between a primary PCI bus and a secondary PCI bus, and includes a bridge for connecting the secondary PCI bus to the primary PCI bus. The bridge has a type "00" configuration header, and identifies, at the time of configuration, one of a plurality of PCI agents including a VGA device on the secondary PCI bus based on a value of a function number field of the configuration command from the device driver, and that the identified agent to execute configuration.

20 Claims, 19 Drawing Sheets

| AD [10:8] | DESTINATION | SUGGESTED ROUTING |
|---|---|---|
| 000 b | PCI-PCI BRIDGE | - |
| 001 b | S_A_D [28] | DEVICE 1 |
| 010 b | S_A_D [29] | DEVICE 2 |
| 011 b | S_A_D [30] | VGA DEVICE |
| 100 b | S_A_D [31] | DEVICE 3 |
| 101,110,111 b | PCI-PCI BRIDGE | - |

| PIN VALUE | DESCRIPTION |
|---|---|
| 0 b | OFF (NON-VGA DEVICE) |
| 1 b | ON (VGA DEVICE) |

| NR. | DESCRIPTION | MM PCI REG |
|---|---|---|
| 1 | DMA_SOURCE | 064h |
| 2 | DMA_DESTINATION | 068h |
| 3 | DMA_CONTROL | 06Ch |

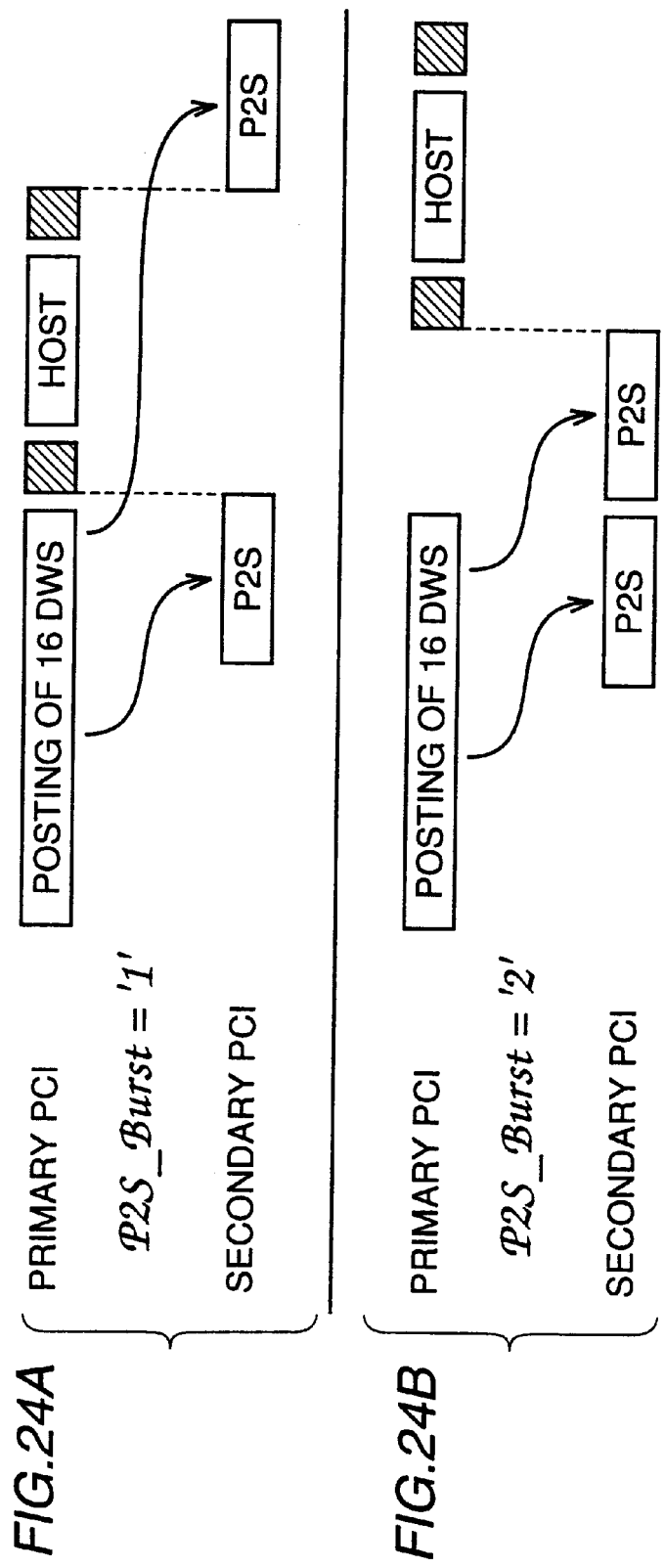

PCI-PCI BRIDGE ALLOWING CONTROLLING OF A PLURALITY OF PCI AGENTS INCLUDING A VGA DEVICE

BACKGROUND OF THE INVENTION

1. Field of the Invention

The present invention relates to a PCI-PCI bridge between a primary PCI bus and a secondary PCI bus. More specifically, the present invention relates to a PCI-PCI bridge supported by an existing BIOS and allowing controlling of a plurality of PCI agents including a VGA device through the primary PCI.

2. Description of the Background Art

A PCI (Peripheral Component Interconnect) bus comes to be generally adopted especially for personal computers. PCI is a bus standard advocated by Intel Corporation, of which specification is determined and published by PCI Special Interest Group (PCI SIG) of the United States.

According to PCI bus standard, a device participating in PCI data transfer is referred to as an "agent." According to PCI standard, agents are controlled by BIOS executed by a CPU, by a device driver and so on. PCI bus standard provides automatic configuration capability of automatically sensing a device connected to the bus at the time of power on and preparing system environment such as memory mapping for each system.

Recently, as personal computers come to have ever improved performance, it comes to be a common practice to execute, by a personal computer, image processing programs and the like which have conventionally been executed by a workstation. For this purpose, an LSI (semiconductor integrated circuit) for performing such a specific processing is often connected to a host CPU through a PCI bus in the personal computer. Implementation of a plurality of PCI devices in the integrated circuit is desirable in some cases. At that time, it is necessary to interface the PCI bus of the host with a PCI bus of an added device. Here, the PCI bus in the host CPU is referred to as a primary PCI bus, and the PCI bus of a circuit (add-in board) connected to the primary PCI bus is referred to as a secondary PCI bus.

If a secondary PCI bus is connected to the primary PCI bus and a plurality of PCI agents are connected to the secondary PCI bus, it is necessary for the host to control each PCI independent from each other. For this purpose, PCI standard employs data referred to as PCI configuration header. The header includes two types, that is, type "00" and type "01". Type "00" header is recognized by the host CPU as one PCI agent, and type "01" header is prepared for the PCI-PCI bridge.

The PCI-PCI bridge of type "01", however, suffers from various problems. For example, it can support limited BIOS only, it is difficult to support DMA (Direct Memory Access) function, and it is difficult to incorporate LSI core in a device having the secondary PCI bus. Accordingly, use of type "01" header is rather disadvantageous when various circuits for image processing are incorporated in one semiconductor integrated circuit device, one of which is a PCI agent. Data transfer through the primary and secondary PCI buses need be stable and at high speed. Here, generally, the secondary bus is faster than the primary bus. Accordingly, an FIFO (First In First Out memory) is used for the data transfer. If there should be a specification change, however, FIFO design must also be changed, resulting in longer time period necessary for the overall design.

Further, it is advantageous to ensure compatibility with an existing VGA device so that any trouble or accident at the time of boot-up may be displayed on the VGA device. Though it is possible to display an error message at the time of boot-up using the add-in board for the graphic processing mentioned above, such processing is complicated as compared with the process using the existing VGA device. Therefore, it is preferable that components including the VGA device are connected to the secondary PCI bus and that the components are switched as needed. Such approach, however, has been difficult for the PCI-PCI bridge of type "01" header.

SUMMARY OF THE INVENTION

Therefore, an object of the present invention is to provide a PCI-PCI bridge connecting a semiconductor integrated circuit device having a secondary PCI bus to a primary PCI bus without using type "01" header, and capable of independently controlling individual PCI agent.

Another object of the present invention is to provide a PCI-PCI bridge capable of connecting a secondary PCI bus and a primary PCI bus, where a VGA device as well as PCI agents are incorporated.

An additional object of the present invention is to provide a PCI-PCI bridge allowing, in a simple manner, error message display at the time of boot-up using an existing VGA device.

A still further object of the present invention is to provide a PCI-PCI bridge allowing DMA transfer.

A still further object of the present invention is to provide a PCI-PCI bridge capable of high speed data transfer between a main memory and a PCI agent or an operation circuit for performing a specific operation on the secondary PCI bus.

A still further object of the present invention is to provide an FIFO used for the PCI bridge and facilitating design of the PCI-PCI bridge.

The PCI-PCI bridge in accordance with the present invention is connected to a primary PCI bus and a secondary PCI bus, and includes a bridging circuit for connecting the secondary and primary PCI buses and for controlling data transfer therebetween. The bridging circuit has type "00" configuration header, and includes a circuit for identifying, at the time of configuration, one of a plurality of PCI agents on the secondary PCI bus based on a value of a function number field of a configuration command applied from a device driver, and for letting the identified agent execute configuration.

The PCI-PCI bridge employing type "00", header is surely supported by BIOS. Though the bridge is not recognized by the BIOS as a PCI-PCI bridge, the bridge is capable of identifying one of a plurality of PCI agents on the secondary PCI bus using the function number field of the configuration header so as to allow the identified agent to perform configuration. As a result, it becomes possible for a device driver to flexibly control agents on the secondary PCI bus.

Preferably, the plurality of PCI agents include a VGA device and other PCI agents. The bridging circuit is operable selectively in one of a first mode in which a memory map for the VGA device only is active and a second mode in which PCI agents other than VGA are active.

That the switching is possible between the first mode in which only the VGA device is operable and the second mode in which PCI agents other than the VGA are operable enables simultaneous execution of a program using the VGA and operating in the conventional DOS, and a novel procedure by a PCI agent.

More preferably, the bridging circuit is boot-up in the first mode, and switched to the second mode by a device driver operating on a processor connected to the primary PCI bus.

Since the bridging circuit is activated in the first mode in which only the memory map for the VGA is active, display of an error message, for example, can readily be given by the VGA. Once the device driver starts its operation, the operation mode is switched to the second mode, and therefore execution of a processing using the PCI device can be started smooth.

More preferably, the PCI-PCI bridge further includes an operation circuit for performing a specific processing and capable of data transfer with the primary and secondary PCI buses. The bridging circuit manages data transmission/reception between the operation circuit and the primary and secondary buses.

Implementation of the operation circuit on the PCI-PCI bridge ensures powerful service for the host CPU. Especially when the amount of calculation is formidable as in a graphic processing, provision of a dedicated operation circuit reduces load on the host CPU.

More preferably, the PCI-PCI bridge further includes an on the fly direct data transfer circuit responsive to a trigger of direct data transfer from the main memory by the device driver for performing following designated data transfer without any intervention of the device driver, and responsive to a link list appended at a tail of a data block to be transferred, for performing data transfer newly determined by the link list without any intervention of the device driver.

Once the initial DMA transfer is set up, the DMA transfer is configured on the fly, and the next DMA transfer is performed automatically. Accordingly, there is not an overhead of the host (device driver) in data transfer from the main memory to other components, whereby efficient data transfer is possible.

According to another aspect of the present invention, the first in first out memory is for interfacing data transfer between components operating at different clock frequencies, and includes a write state machine for a write port, a read state machine for a read port, and a plurality of memory banks arranged in parallel between the write state machine and the read state machine.

The size of the first in first out memory can readily be changed by the number of memory banks arranged in parallel between the write state machine and read state machine. With the first in first out memory structured in this manner, in a design utilizing hardware description language, for example, the size of the first in first out memory is reduced to one parameter, that is, the number of memory banks arranged. This facilitates modification of design of the first in first out memory at a sudden design change or specification change, and hence time period necessary for device development is made shorter.

According to a still further aspect of the present invention, the PCI-PCI bridge is connected to a primary PCI bus and a secondary PCI bus, and includes a bridge for connecting the secondary and primary PCI buses. The bridge has a type "00" configuration header and, at the time of configuration, identifies one of a plurality of PCI agents on the secondary PCI bus based on a value of a function number field of a configuration command applied from the device driver, and lets the identified agent execute configuration.

Preferably, the plurality of PCI agents include a VGA device and other PCI agents. The bridge is operable selectively in one of a first mode in which only a memory map for the VGA device is active and a second mode in which PCI agents other than the BGA are active.

More preferably, the bridge is boot-up in the first mode and switched to the second mode by the device driver operating on a processor connected to the primary PCI bus.

More preferably, the PCI-PCI bridge further includes an operation core capable of data transfer with the primary and secondary PCI buses for performing a specific processing. The bridge manages data transmission/reception between the operation core and the primary and secondary PCI buses.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 24A and 24B show a relation between a value of a 'P2S_Burst' register and data transfer timing.

DETAILED DESCRIPTION OF THE PREFERRED EMBODIMENTS

In the following, an embodiment will be described which is implemented as an add-in board using a PCI-PCI bridge incorporated in a graphic processor. It goes without saying that the present invention may be implemented in the form of any board suitable not only for the graphic processor but also for other processings.

[Overall configuration]

Figure 1:
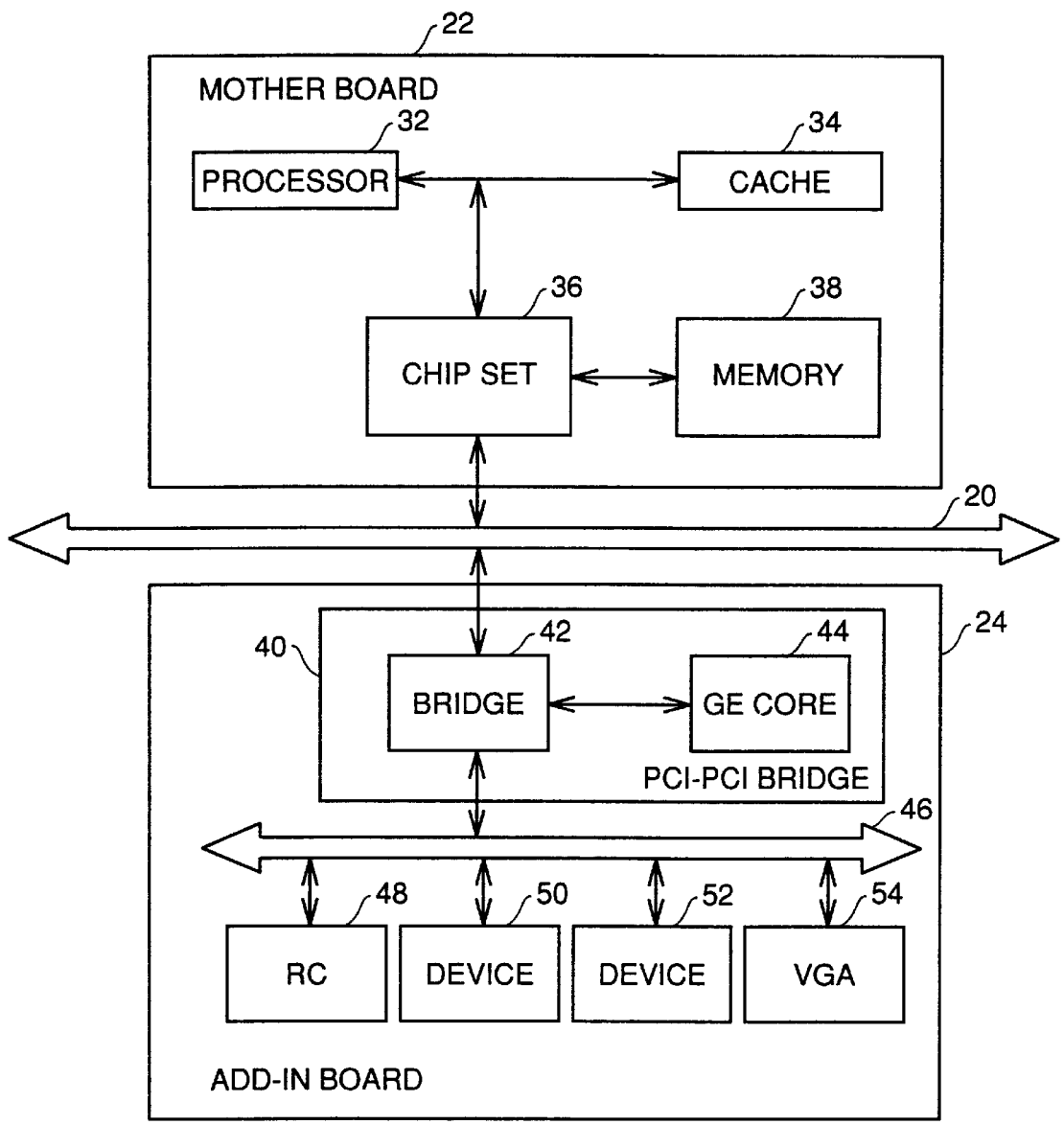
FIG. 1 is a block diagram showing an overall configuration of a system including the PCI-PCI bridge in accordance with a first embodiment of the present invention.

Referring to FIG. 1, a PCI-PCI bridge 40 in accordance with one embodiment of the PCI-PCI bridge of the present invention is implemented on an add-in board 24 and is connected to a primary PCI bus 20. A mother board 22 is connected to primary PCI bus 20. Various circuits on add-in board are controlled by a BIOS executed by a processor 32 or a device driver, on mother board 22.

Mother board 22 includes processor 32, a cache 34, a memory 38, and a chip set 36 for controlling data transfer between each of processor 32, memory 38 and primary PCI bus 20.

Add-in board 24 includes a secondary PCI bus 46 connected by PCI-PCI bridge 40 to primary PCI bus 20, and an RC (Rendering Controller) 48 for graphic rendering, two different devices 50 and 52, and a VGA device 54 which are connected to the secondary PCI bus 46, respectively. PCI-PCI bridge 40 includes a GE (Geometric Engine) core 44 for performing, among image processings, geometric operation, and a bridge portion 42 for interfacing data transfer between each of primary PCI bus 20, secondary PCI bus 46 and GE core 44. It goes without saying that PCI device configuration is not limited to the example shown in this embodiment.

Figure 2:
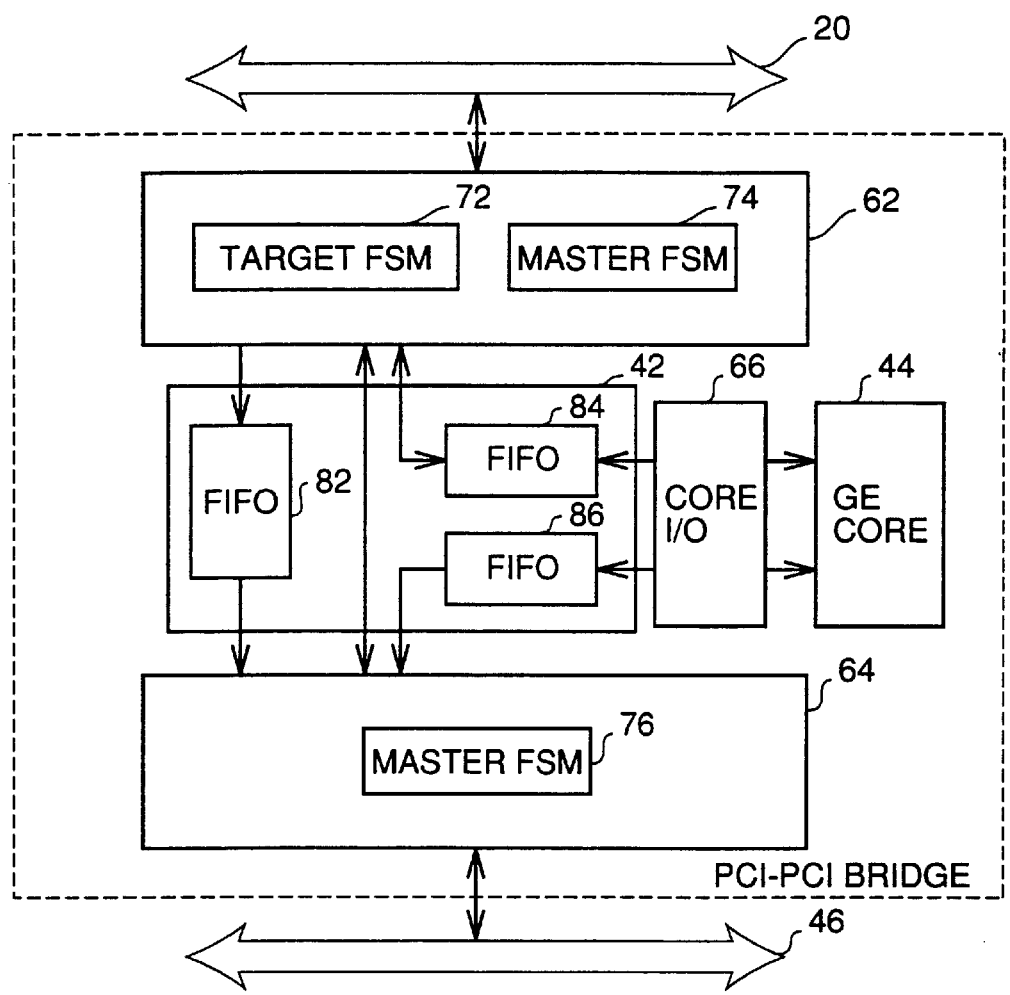
FIG. 2 is a block diagram of the PCI-PCI bridge in accordance with the first embodiment of the present invention.

Referring to FIG. 2, PCI-PCI bridge 40 will be described in greater detail. PCI-PCI bridge 40 includes a core I/O 66 between bridge portion 42 and GE core 44, a primary I/O 62 between bridge portion 42 and primary PCI bus 20, and a secondary I/O 64 between bridge portion 42 and secondary PCI bus 46. GE core 44 ensures powerful support for image processing, and reduces load on processor 32.

Primary I/O 62 includes a target FSM (Finite State Machine) 72 and a master FSM 74. Secondary I/O 64 includes a master FSM 76 controlling input/output to and from secondary PCI bus 46. Secondary I/O 64 includes SSO (Simultaneous Switching Outputs), not shown, as a state machine controlling operations of the primary and secondary PCI buses 20 and 46, as will be described later.

Bridge Portion 42 includes an FIFO 82 between primary I/O 62 and secondary I/O 64, and FIFOs 84 and 86 provided between primary I/O 62 and GE core 44 and between secondary I/O 64 and GE core 44, respectively.

Of the configuration space headers in accordance with the PCI bus standard, type "00" header is used in add-in board 24 in accordance with the present embodiment, and it is surely supported by all BIOSs. Due to the lack of BIOS support for PCI-PCI bridges enjoyed by type "01" configuration space, a special approach has been taken in the present embodiment as will be explained in the following.

The configuration space located within the add-in board 24 represents only the bridge chip, as type "00" header is used. Various PCI agents and the like contained therein cannot be seen by the BIOS executed by processor 32. The PCI agents or VGA in add-in board 24 cannot request any memory space from BIOS when a POST routine, which is part of BIOS for obtaining information for configuration is executed at power-up. Thus, in add-in board 24 in accordance with the present embodiment, PCI-PCI bridge has to request the memory space for the agents or VGA. Since VGA device 54 is located on add-in board 24 of the present embodiment, management of memory space have to be additionally considered at the time of boot-up, which will be described later.

All registers except for ID registers (such as vender/device and revision ID) providing unique IDs, represent the add-in board 24 as it is seen at the primary PCI bus. For example, the status/command bits in a register 04$h$ determine the behavior of the add-in board on the primary PCI bus. If memory cycles are disabled via bit [1] of register 04$h$ in the configuration space of the bridge, no data can be transferred to the devices on the secondary PCI bus, even if their configuration set up enables memory cycles.

After initialization/reset the add-in board is in a disabled state. During the POST routine, memory space is allocated to the bridge by the BIOS, according to the value in a register 10$h$ of the bridge's configuration space. Allocation of the memory space is requested by the PCI-PCI bridge 40 on behalf of the add-in board. The BIOS allocates the space to PCI-PCI bridge 40, while it has no influence on the allocation boarders within that space. Allocation boarders is determined solely by PCI-PCI bridge 40 and the device driver operating on processor 32.

The BIOS is not aware of the existence of the secondary PCI bus, since no type "01" header has been used for the PCI-PCI bridge of the present embodiment. Thus, the device driver has to initialize and configure the devices on the secondary PCI bus in place of the BIOS. This includes, first, setting of base address registers (BARs). Contents of the BARs represent offset of memory space allotted to respective devices. Since no memory space is allocated to respective devices, the devices cannot be accessed via "memory read/write" commands. However, the device driver can access the configuration spaces of the devices via a special "configuration read/write" command (which will be described below).

Based on the value written into register 10$h$ of the configuration space of the bridge by the BIOS, the device driver allocates the base address of the devices connected to the secondary PCI bus according to the memory map. Thus, the device driver has to write the corresponding values to register 10$h$ of the configuration space of the respective device on the secondary PCI bus.

The configuration mechanism #1, as suggested by the PCI specification (Revision 2.1), uses two DWord (DWord representing two 16 bit words) I/O locations for generating configuration cycles via the host bridge. The first DWord location (CF8$h$) references an R/W register named "CONFIG_ADDRESS." FIG. 3 shows a format of this register 90.

Figures 3, 4, 5:
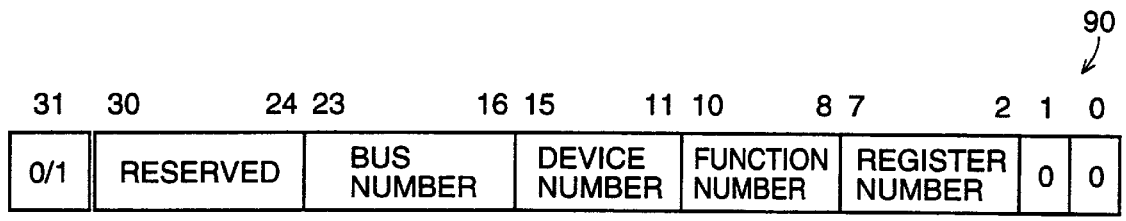
FIG. 3 shows bit configuration of the type "00" header.
FIG. 4 shows, in the form of a table, relation between function numbers and corresponding devices.
FIG. 5 shows, in the form of a table, meanings of strap signal values indicating whether a VGA device is included or not.

Referring to FIG. 3, register 90 includes the register number (bits [7:2]) and the function number (bits [10:8]) of the targeted configuration space. Since the bridge employs type "00" header, the bridge is not regarded as a multifunctional device, and three bits of the function number are not used by the BIOS. Therefore these three bits can be utilized freely by the device driver. The targeted configuration space is determined by using these three bits, and the manner of determination is indicated, in the form of a table, in FIG. 4.

In FIG. 4, "AD" represents data on an address.device bus. "Destination" represents destination. The rightmost column of FIG. 4 represents examples of targeted devices corresponding to the destinations. Among the examples of FIG. 4, the function number is allocated without fail when there is a VGA device. Except for the VGA device, all devices can be routed arbitrarily by the system designer.

The configuration space of the bridge can be accessed directly and without latency by setting the function number to 000$b$ (or the default values 101$b$, 110$b$, 111$b$). If, for example, a device 1 (Dev_1) is to be accessed, the function number has to be set to 001b. On the primary PCI bus, a configuration cycle will be generated and claimed by the bridge, since its 'IDSEL' has been activated at this time.

This signal corresponds to a so-called chip select signal, for selecting a device to perform configuration. The address is analyzed by a primary FSM (Finite State Machine) in bridge portion 42. When sensing the "100b" in the function number bits, 'Bridge Data Path' (connecting primary I/O 62 with secondary I/O 64 in FIG. 2) within the bridge is utilized, and the cycle is propagated to the secondary FSM within the PCI-PCI bridge. According to the table of FIG. 4, a corresponding 'S_A_D' (Secondary Address Data) line is activated and the propagated configuration cycle is generated on the secondary PCI bus. Here, the function number is reset to 000b.

[VGA]

VGA has a fixed, DOS compatible memory range (A0000–BFFFFh) and a fixed set of I/O ports (3B0-3BB, 3C0-3DFh). VGA devices on PCI also have relocatable options for the memory and IO space.

If multiple VGA devices are in the system, they cannot share the same memory and IO space. Therefore, the BIOS relocates them as necessary before enabling the VGA devices. All PCI devices are required to power up with their memory and I/O space disabled, in order to prevent conflicts until POST routine is finished.

The PCI-PCI bridge of the present embodiment supports both default DOS-compatible memory space and its relocated counterpart. However, it only supports DOS-compatible default I/O space and its relocated counterpart within the lower 64 KB as well as some special addresses.

The devices located at the secondary PCI bus cannot be seen by the BIOS, as type "00" header is used in the PCI-PCI bridge. If there is a VGA device on the secondary bus, it must be indicated to the BIOS during POST routine.

The PCI-PCI bridge of the present embodiment has to know in advance whether there is a VGA device on the secondary PCI bus. This information is set by a strap signal, which is applied to a specific pin such as shown in FIG. 5, for example. The signal is applied by a dip switch, for example, and set only once dependent on whether the devices connected to the secondary PCI bridge includes a VGA device or not. In the example shown in FIG. 5, if the signal applied to the pin is 0b, VGA device is absent, and if the signal is 1b, VGA device is present, respectively.

If the value of the strap signal is "on", that is, when the value on the pin is 1b, VGA related registers within the configuration space have to be shadowed by the PCI-PCI bridge. Here, briefly stated, "shadow" means keeping of a copy. More specifically, besides the default registers, there is provided a dedicated register for the VGA related accesses in the PCI-PCI bridge. Depending on the strap signal value, either the default register or the dedicated VGA register is selected for a read/write access of the configuration space of the PCI-PCI bridge.

Registers to be shadowed include command register [04h], add-in board memory base address register [10h] and extended ROM base address register [30h].

Figure 6:
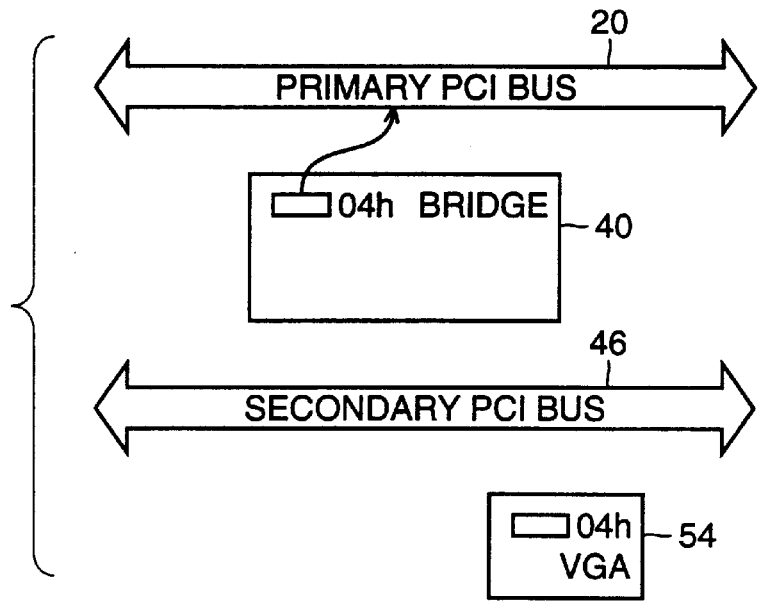
FIG. 6 shows reading from a shadowed register.
Figure 7:
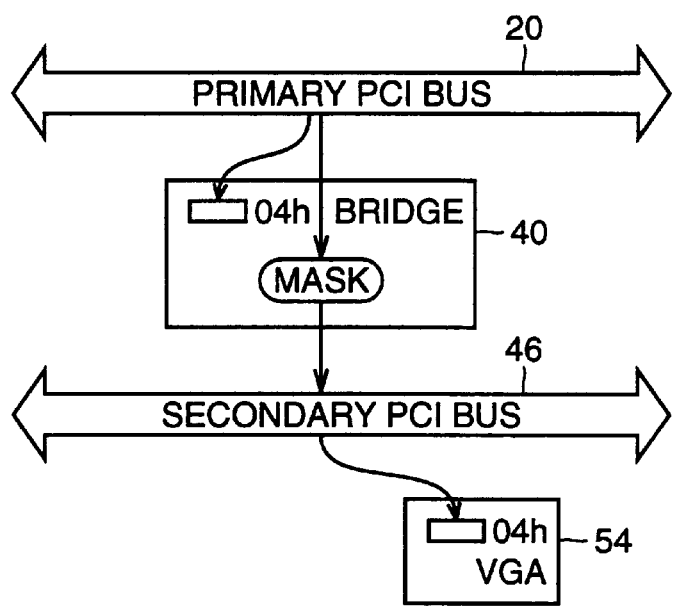
FIG. 7 shows writing to a shadowed register.

Referring to FIG. 6, a copy of register 04h of VGA device 54 is held in PCI-PCI bridge 40. When the strap signal is on and there is a configuration read access, a value is read not from register 04h of VGA device 54 but from the copy corresponding to register 04h of PCI-PCI bridge 40, as shown in FIG. 6. In case of writing, copied registers of PCI-PCI bridge 40 are written, and the cycle is masked in PCI-PCI bridge, and through secondary PCI bus 46, register 04h in the configuration space of VGA device 54 is written.

Thus, the essential registers of the configuration space of the VGA device are initialized during POST as required. The BIOS will enable the memory and I/O space by setting the corresponding bits in the command register, which information will be propagated to the VGA device as well, thereby initializing/configuring the VGA device.

Special care has to be taken when propagating the VGA related configuration cycles to the VGA device on the secondary bus. For example, the PCI-PCI bridge does not support snooping of a DAC (Digital/Analog Conversion) palette. Thus, bit [5] of the configuration space of the PCI-PCI bridge is hardwired to "0" and not writable. If the complete configuration cycle is propagated to the secondary PCI bus, however, erroneous writing to register 04h of the configuration space of the VGA device is possible, thereby snooping on the secondary PCI bus can be enabled.

Figure 8:
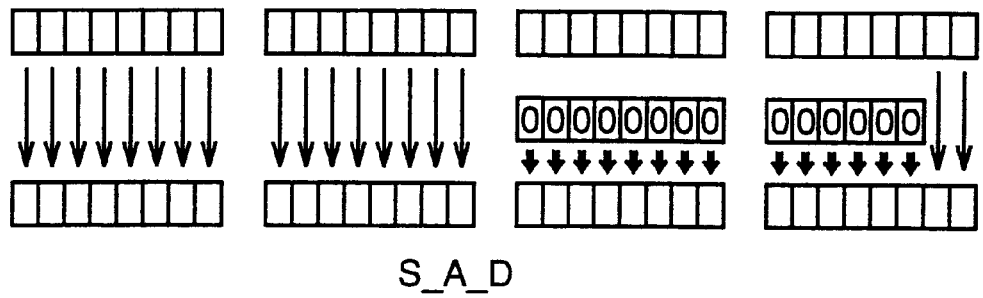
FIGS. 8, 9 and 10 show masking at the time of writing to the register.

Accordingly, critical bit ranges are protected against any accidental write by masking the respective bits. In case of register 04h, bits [15:2] are forced to "0" as shown in FIG. 8.

The selective masking allows the status bits to be cleared and the memory and I/O space of the VGA device to be enabled. The clearing of the status bits is a precaution to prevent malfunctioning of the VGA device following reset if its status bits are not cleared. The BIOS will typically clear those bits during initialization prior to other accesses to the VGA device.

Figure 9:
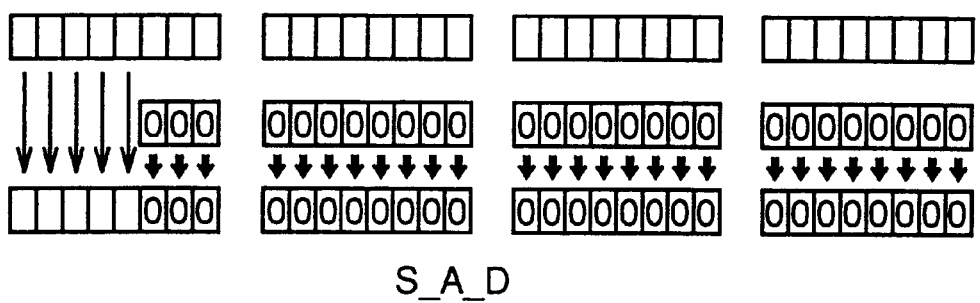

Register 10h is not dependent on the strap as far as read/write permissions are concerned. If a configuration write access to this register takes place, however, the access will be propagated to the secondary side. FIG. 9 shows masking at the time of propagation.

The masking of the lower 27 bits as shown in FIG. 9 ensures that the memory space of the VGA device is aligned to 128 Mbyte. In other words, lower boundary of the memory space of the VGA device is aligned with the bottom of the memory range requested by the PCI-PCI bridge.

Figure 10:
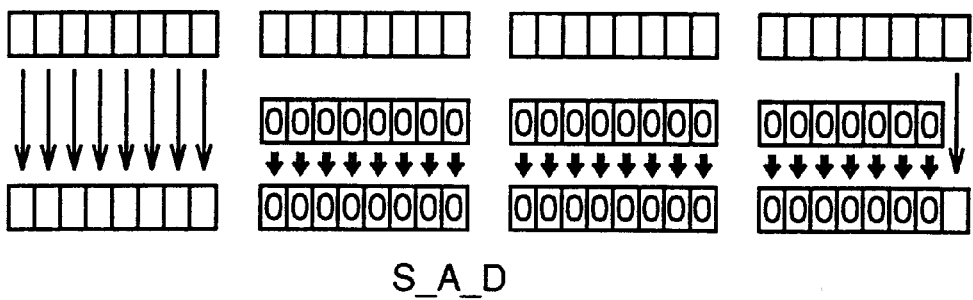

Register 30h is completely dependent on the strap and will not be writable if the strap signal is off. If the strap signal is on, masking such as shown in FIG. 10 takes place. The masking of the lower 24 bits (assuming that LSB is "0") ensures that the ROM space of the VGA device is aligned to 16 Mbyte and gives the BIOS the ability to enable/disable the expansion ROM via the LSB.

The size of the memory space requested by register 10h of the configuration space of the VGA device depends on the respective VGA device. The size may range from several Mbit to 64 Mbyte or more. To support as many VGA devices as possible, the following special approach is taken.

Figure 11:
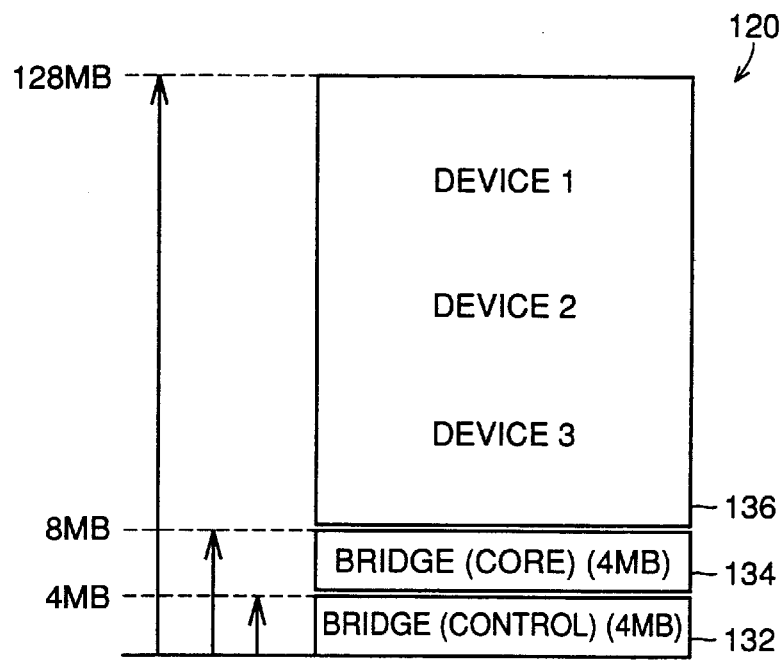
FIG. 11 schematically shows a general memory map.
Figure 12:
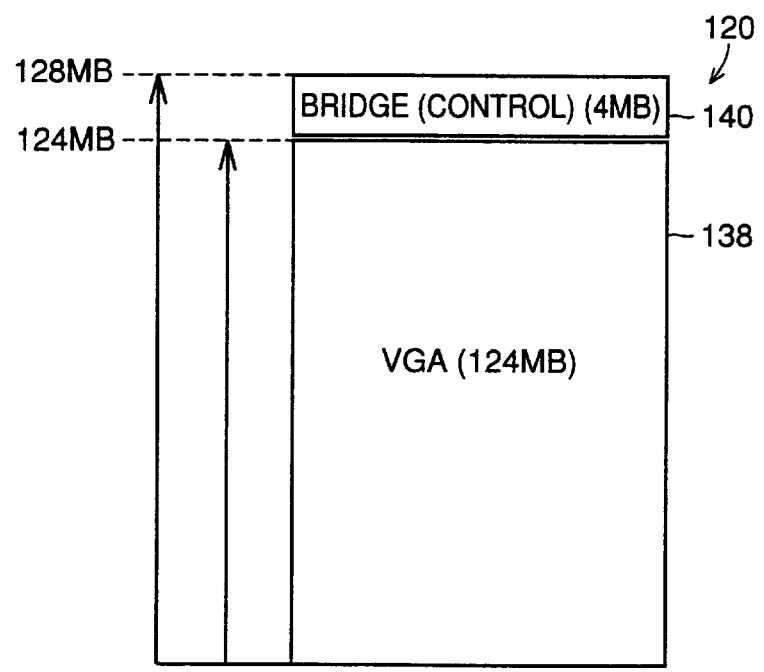
FIG. 12 schematically shows a VGA memory map.

More specifically, the device driver is adapted to be switchable between a generic memory map such as shown in FIG. 11 and the VGA memory map such as shown in FIG. 12. Switching is possible by operating the bit [0] of a register 40h of the PCI-PCI bridge configuration space. Referring to FIG. 11, according to the generic memory map, memory space 120 is divided into a space 132 for bridging (control) of lower 4 Mbyte, a space 134 for bridging (core) of 4 Mbyte thereabove, and a space 136 for respective devices. The VGA memory map is divided into a VGA space 138 of 124 Mbyte, and a space 140 (4 Mbyte) for bridging (control) thereabove.

At start-up, the PCI-PCI bridge will come up with the VGA memory map active. After the BIOS assigns the 5-bit offset, that is, allocates 128 Mbyte memory range, the PCI-PCI bridge propagates the lower 124 Mbyte to the secondary PCI bus. Since all devices other than the VGA device come up with their memory and I/O space disabled, only the VGA, which has been enabled by the BIOS will claim the cycles. After boot-up, the device driver starts its function. The device driver disables the VGA, enables other devices and selects the generic memory map. At the start-up, the VGA memory map is selected, and it facilitates display of an error message, if any, by using the VGA device. The memory map of FIG. 11 and the memory map of FIG. 12 can be switched by the operation of bit [0] of register 40h of the PCI-PCI bridge configuration space. Accordingly, when a conventional DOS-compatible program is used, the program will be executed by switching the memory map to the one shown in FIG. 12.

In order to support error handling, the respective responses have to be selected, the resources be enabled and the status flags have to be accessible for enabling the driver to service the requests. This cannot be done if the PCI-PCI bridge memory space is not enabled, that is, if the memory mapped configuration space register is not accessible. Therefore, the PCI-PCI bridge memory space residing at the lower 4 Mbytes of the generic memory map is adapted to be relocated to the upper 4 Mbyte of the VGA memory map.

Figures 13, 14:
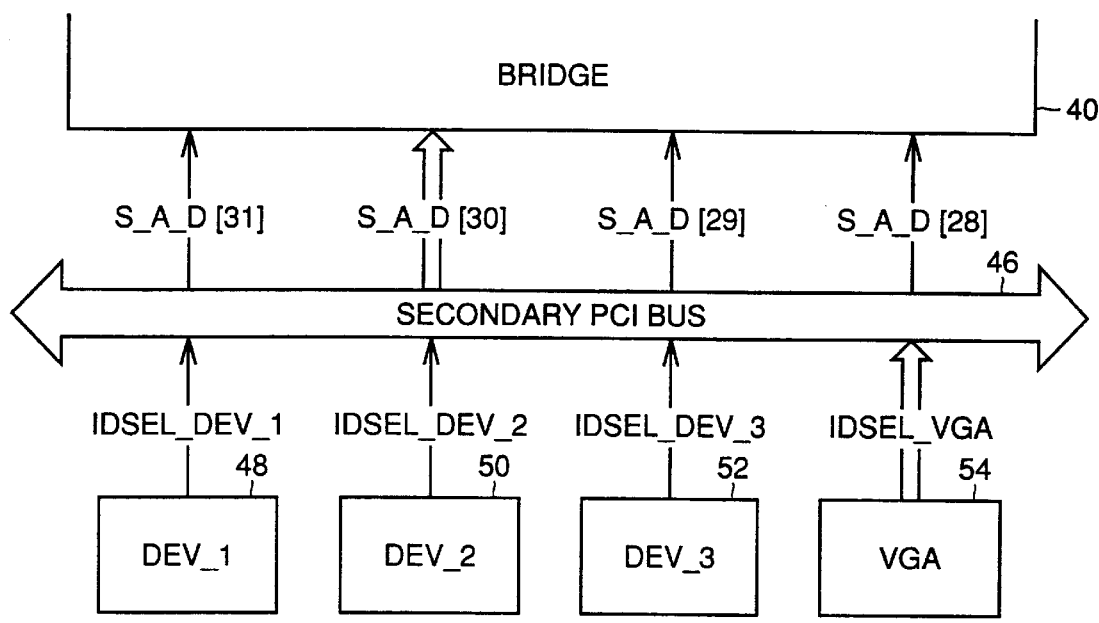
FIG. 13 shows relation of IDSEL connection between the bridge and VGA device.
FIG. 14 shows, in the form of a table, registers for setting up DMA transfer.

In order to be able to propagate the VGA-related configuration cycles to the VGA device, the 'IDSEL' line of VGA device 54 has to be connected to a fixed line as indicated in FIG. 13. Connection is as shown in the table of FIG. 4.

[DMA access]

When executing a DMA (Direct Memory Access), the PCI-PCI bridge acts as a master on the primary PCI bus with the main memory, that is, the "host bridge" (existing in a chip set) as a target. Data is transferred either to a GE core 44 or the secondary PCI bus 46.

In order to initiate a DMA-access, the device driver has to load DMA related registers with values in the PCI-PCI bridge and to set a flag which triggers the DMA access. The start address of the block to be transferred is stored in a register 'DMA_Source'. This address must be a valid address within the memory space of the main memory. More specifically, a target different from the PCI-PCI bridge must respond on the primary PCI bus.

The actual target of the DMA access is determined by the address loaded into register 'DMA_Destination'. The address is checked against the memory map shown in FIG. 11, and in accordance with the result, data is transferred to the PCI-PCI bridge, that is, the secondary PCI bus.

The amount of data to be transferred is determined by loading register 'DMA_DWords' with the number of DWords constituting the block.

Further, as mentioned above, it is necessary to set the flag 'DMA_Trigger' in order to initiate a DMA access.

Of the above described DMA-related registers, the register 'DMA_Source' and the register 'DMA_Destination' are incremented successively, serving as pointer of the current source and target addresses. The register 'DMA_DWords' is not incremented, and is compared with a value of a dedicated counter prepared for DMA transfer. If the target address is not within the memory map, the PCI-PCI bridge will stay idle, and no DMA transfer is triggered.

If the DMA transfer on the primary PCI bus is concluded, conclusion has to be indicated to the device driver. Two options can be selected for this purpose.

After the conclusion of transfer on the primary PCI bus, an interrupt request is always set by a certain bit in the main memory (MM) PCI register. However, this interrupt request can be masked by another control register.

Since the interrupt option is not very efficient, another notification option is provided by means of a MM PCI register 'DMA_Semaphore'. The device driver writes an address within the main memory to the register only once after initialization prior to DMA transfer. The location within the main memory is accessible by the device driver and is used as a semaphore indicating the end of the DMA transfer. The device driver writes all zero to the location so as to initialize the semaphore. After the conclusion of transfer on the primary PCI bus, the DMA FSM will issue a memory write cycle targeted at the semaphore located within the main memory, and transfer a MM PCI register 'Global_Status'. The LSB of the semaphore is thereby set to "1" which indicates to the driver that the DMA transfer is complete.

In addition to the single bit signaling the end of the DMA transfer, a complete "snapshot" of the PCI-PCI bridge is provided by the remaining 31 bits of the semaphore. This gives the device driver the chance to analyze the status of the PCI-PCI bridge on the fly without any overhead.

The length of a DMA burst is determined by the following.

(1) Number of DWords to be transferred, that is, the value loaded into the register 'DMA_DWords'.
(2) Target response, that is, response to disconnect.
(3) Latency timer value, that is, the value of register 0Ch of the PCI-PCI bridge configuration space.
(4) POSTing buffer status.

If the POSTing buffers are full, the master will terminate the transaction and waits until the buffer can receive data again and then issues a new cycle. This is also the case if the latency timer of the PCI-PCI bridge expires and a signal 'P_GNT' for primary PCI bus handshaking is deasserted. The device driver checks the value of the latency timer after start-up and may load a different value, if necessary.

A latency counter is incremented every cycle, even if no data is transferred. In other words, the latency counter is counted up independent of the response of the targets. If the latency counter is equal to the value written to a register 'Latency Timer', a signal 'P_FRAME' is deasserted and the master is terminated.

If a master abort error occurs on the primary PCI bus, a flag 'DMA_Trigger' is reset, the DMA transfer is terminated, and a corresponding error handling is carried out. This applies to both the actual DMA transfer and the semaphore write.

DMA is always carried out via POSTing buffers. The DMA FSM does not check MM PCI register 'FIFO_Control' prior to accessing the POSTing buffers.

A "link" option is added to the DMA master of the PCI-PCI bridge in accordance with the present embodiment, to improve DMA performance. This option allows the device driver to perform multiple DMA transfers automatically without the overhead of issuing multiple requests of DMA transfers.

Therefore, the device driver has to insert link data in between the data blocks of the main memory before triggering the DMA transaction. The link data consists of three DWords including address and control information, which are written to corresponding MM PCI registers. Relation between the DWords and MM PCI registers is as shown in FIG. 14.

Figure 15:
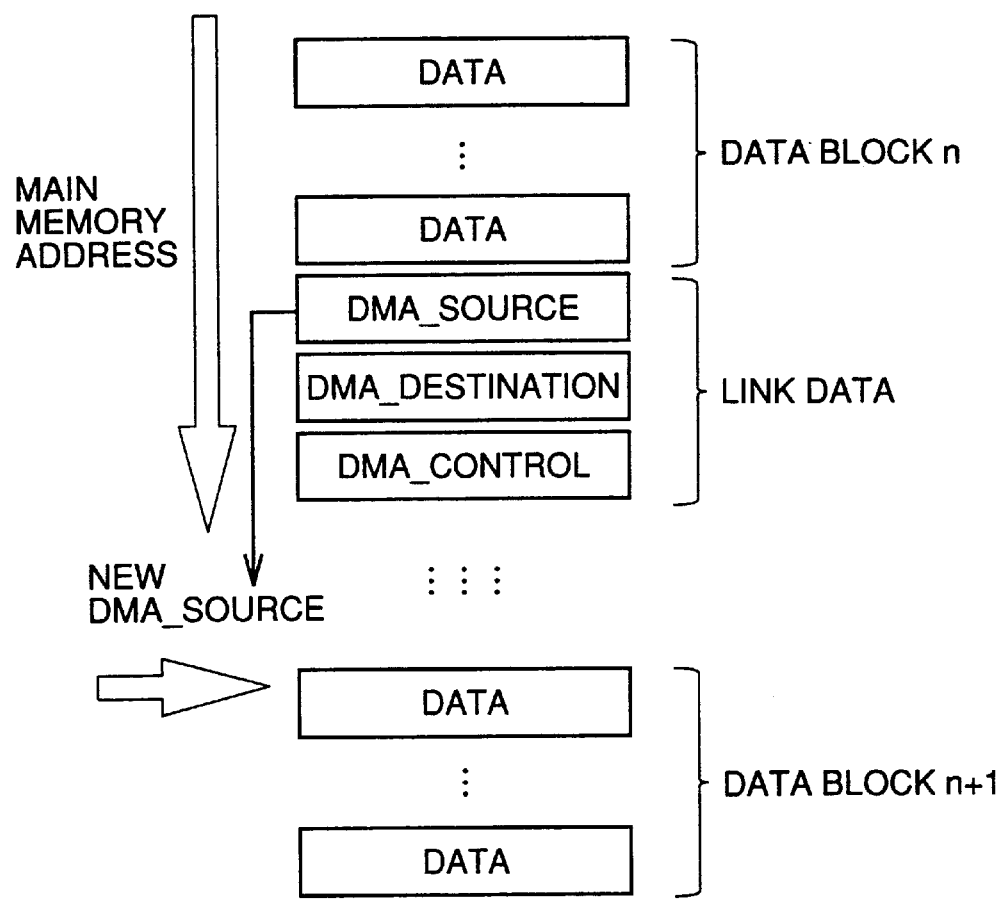
FIGS. 15, 16, 17 and 18 show a method of on the fly configuration for DMA transfer in accordance with the present invention.

Referring to FIG. 15, in the main memory after the device driver sets up the DMA data, the link data block consisting of three DWords is inserted immediately following a data block n. The next block follows the link data. Data transfer destination of data block n+1 is determined by 'DMA_Destination' in the link data added to the tail of the data block n.

Whether multiple data transfers should be automatically executed or not utilizing the link data can be enabled/disabled by a bit [29] ('DMA_Continue') of MM PCI register 'DMA_Control'. This bit indicates whether there is the link data added to the tail of the data block to be transferred. If the bit is set to "1", DMA FSM expects the link data to follow, and as a result, the next three DWords are written to the MM PCI registers. After being reconfigured by the last link data ('DMA_Control') on the fly, the DMA master attempts to read the next data block without terminating the cycles. If 'DMA_Continue' is set to 0, the transaction is concluded after the last DWord of the data block is transferred.

Thus, a new DMA transaction can be triggered automatically at the conclusion of a DMA transfer. The device driver has only to write the link list once to the main memory and, thereafter, multiple DMA transfers can be carried out by the PCI-PCI bridge without requiring any designation from the device driver.

If it is desired to have the semaphore updated in between DMA transfers within the link list, for example, to verify long transfers, a bit can be set accordingly.

Figure 16:
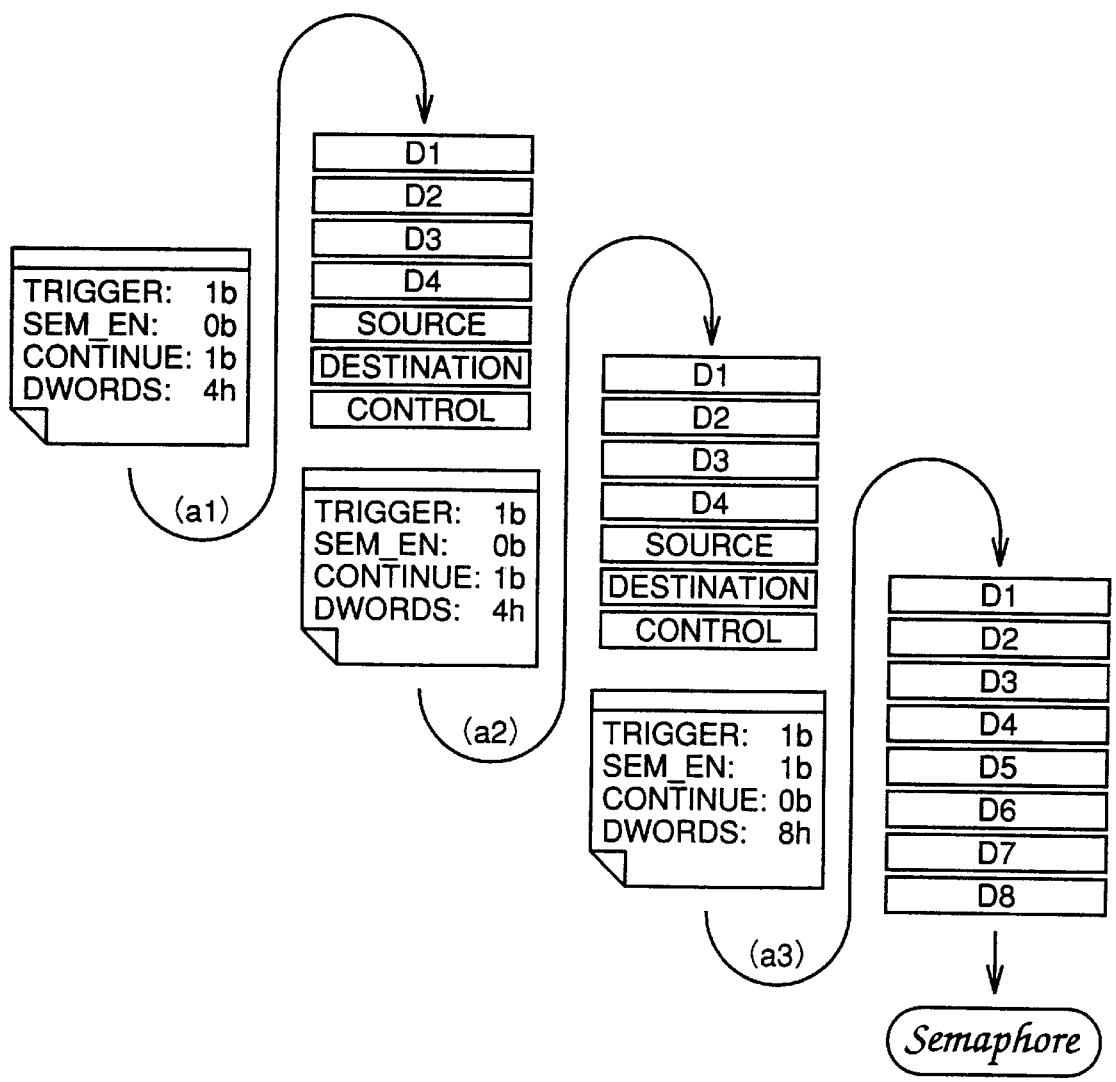

FIG. 16 illustrates how this scheme works. The device driver initially configures the DMA master to transfer four data DWords and, thereafter, to continue the link data (a1). Following that the DMA FSM is configured by the link data to receive the next four DWords, and the processing continues (a2). The second link data configures the DMA master to receive eight DWords, and terminates the DMA transaction and writes a semaphore (a3). After the eight DWords are transferred and the semaphore is written, the DMA FSM returns to IDLE.

Figure 17:
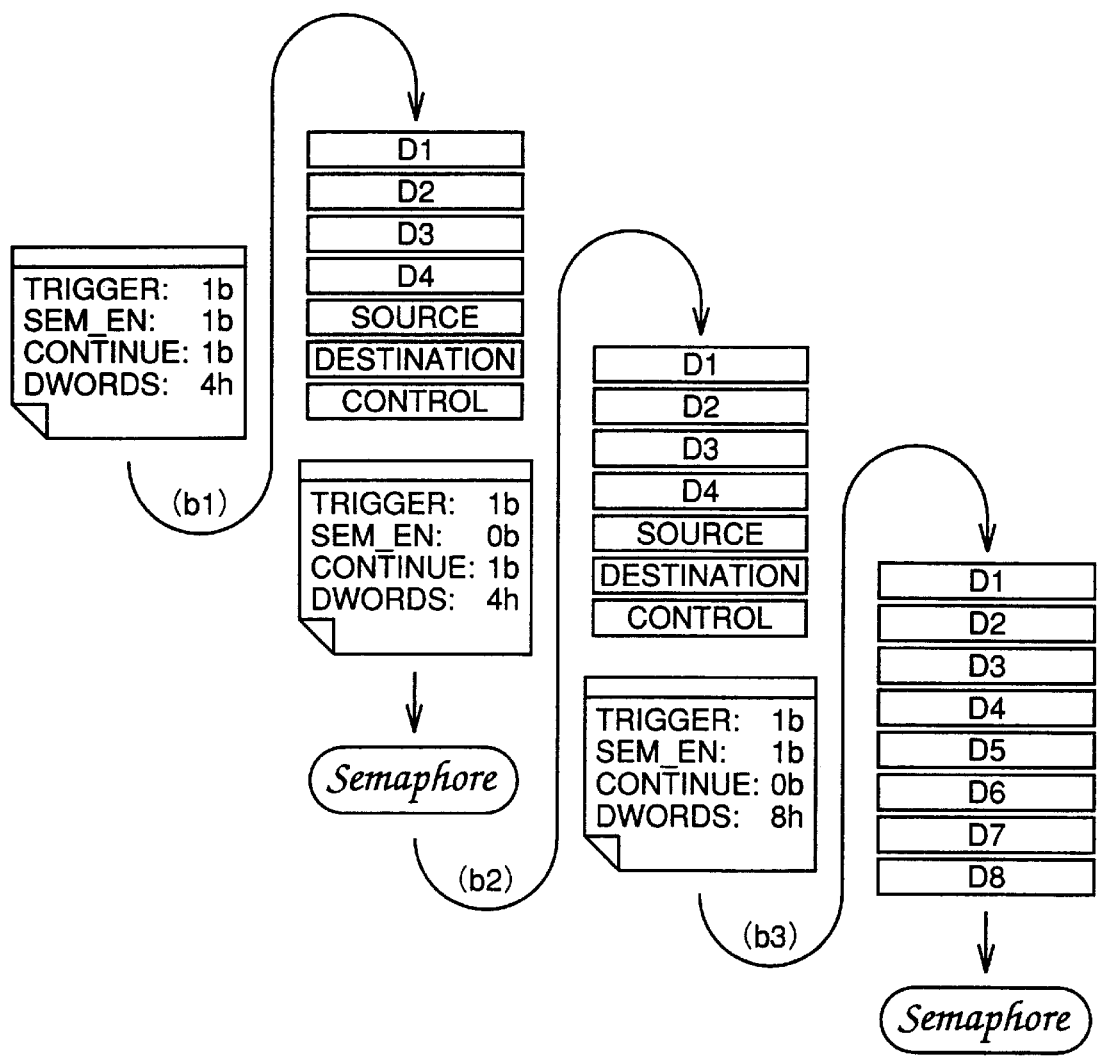

FIG. 17 depicts a DMA link with nested semaphore writes. Similar to the example shown in FIG. 16, the device driver initially configures the DMA master to transfer four DWords of data and after that continue DMA transfers. In this example, however, the device driver enables the semaphore option. As a result, four DWords are read, a semaphore is written, and the master continues its processing (b2). Accordingly, DMA master is set up to read another four DWords and continue processing in accordance with the link data (b2). Since the semaphore option has not been enabled here, the PCI-PCI bridge does not write a semaphore. It is configured to receive eight DWords, terminate the DMA transaction and write a semaphore (b3).

There are three factors that affect the efficiency of DMA transactions.

(1) Due to the restrictions placed by the SSO arbiter, which will be described later, on the PCI-PCI bridge, whenever a new address phase is initiated on the primary PCI bus, the secondary side cannot pump out data. The data can be pumped out from the secondary side, however, when the address phase is over and the data phase starts. Thus, if a DMA transaction is very long, there is only one initial address phase, and therefore the performance of DMA transaction is best. This is because the secondary side can pump out data in parallel with the primary side reading data from the system memory. In this case, only the initial latency has an influence on the transfer (which is referred to as SSO penalty).

(2) Moreover, if a primary PCI bus arbiter takes away a grant of use of the bus after or during the transaction, the PCI-PCI bridge has to request ownership of the primary bus again (re-arbitration penalty).

(3) Many host bridges have a very long initial latency (up to 16 cycles). Thus, if the DMA transaction is terminated early, the PCI-PCI bridge not only has to deal with the SSO arbiter and the primary bus arbiter delay, but in addition to that with the initial access delay of the host bridge.

Hence, a new feature referred to as "domino", which will be described below, has been added. This feature allows continuous memory read bursts from the system memory until the host bridge terminates the transaction. In order to maintain the current DMA setup environment, the LSB of the register 'DMA_Source' is used.

Figure 18:
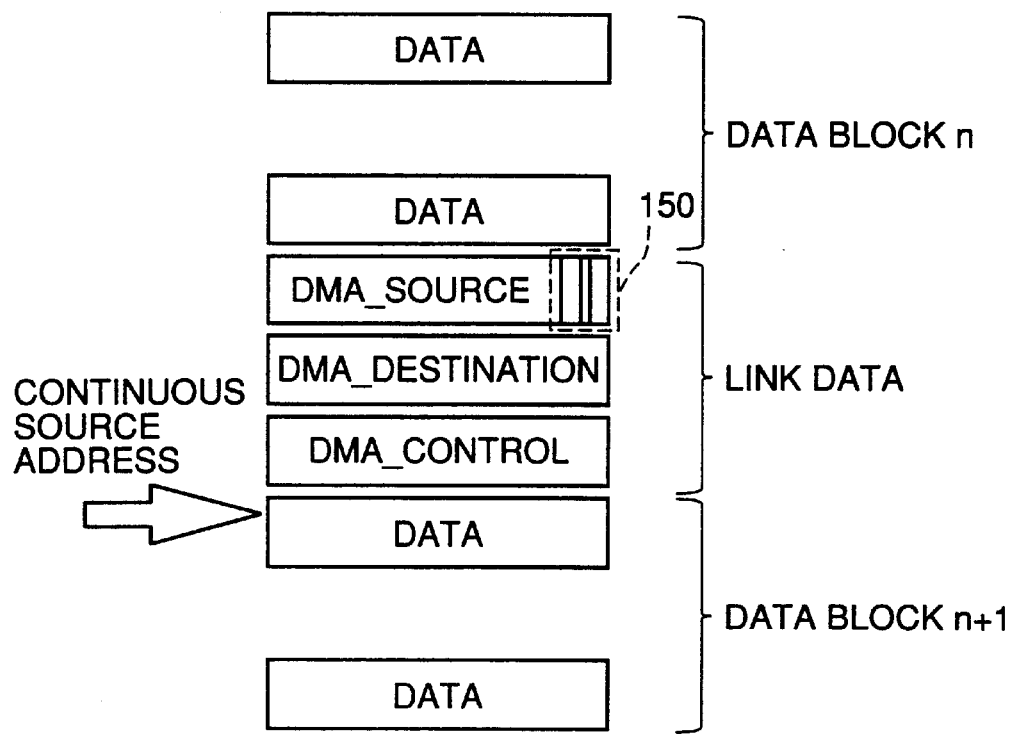
Figure 19:
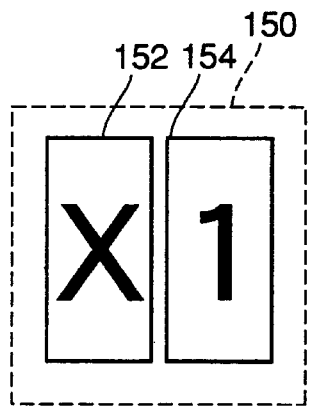
FIG. 19 shows lower 2 bits of 'DMA_Source' of a link data.

Referring to FIG. 18, last two bits 150 of 'DMA_Source' are not used as addressing DWord by DWord is being carried out. Of these two bits 152 and 154, LSB 154 is used. If the LSB is set, PCI-PCI bridge expects that following 'DMA_Source' addresses are continuous, and hence simply continues to increment an internal source counter. A new address phase is not necessary as continuous addresses are accessed. Therefore, after 'DMA_Control' phase, the PCI-PCI bridge continues to request data without terminating the cycle.

[SSO (Simultaneous Switching Outputs) and data flow control]

If the primary I/O (32 bits) and the secondary I/O (32 bits) switch the A_D lines simultaneously, there arises the following problem. If all 64 bits would be driven active at the same time, the resulting power fluctuation could cause the PCI-PCI bridge to malfunction. If the A_D bus is floating or does not toggle, that is, keeps the same value, almost no power is required. Therefore, it is important for the PCI-PCI bridge to efficiently control the driving of the two buses.

Therefore, a specially designed SSO arbiter has been implemented within the PCI-PCI bridge. The SSO arbiter grants permission to drive either the primary AD line or the secondary AD line. This reduces possibility of the PCI-PCI bridge to malfunction because of voltage fluctuation of the power source.

The PCI-PCI bridge drives the AD line of the primary PCI bus in the following cases.

TABLE 1

| As a target | Configuration Read (data phase) |
| --- | --- |
| | I/O Read (data phase) |
| | Memory Read (data phase) |

TABLE 1-continued

| | |
|---|---|
| As a master | Memory Read/Write (address phase) |
| | Memory Write (data phase) |
| | Idle (If parked on Master) |

The PCI-PCI bridge drives the AD line of the secondary PCI bus in the following cases.

TABLE 2

| | |
|---|---|
| As a master | Configuration Read (address phase) |
| | Configuration Write (address phase and data phase) |
| | I/O Read (address phase) |
| | I/O Write (address phase and data phase) |
| | Memory Read (address phase) |
| | Memory Write (address phase and data phase) |

On the secondary PCI bus, "pull-ups" on the board guarantee that the AD lines are not left floating. Thus, the secondary FSM does not have to drive the AD lines if the AD lines are in 'IDLE' state.

There are three sources for driving the secondary AD lines. The first is a bridge data path which is used for configuration and I/O cycles. The data path bypasses FIFOs when the FIFOs are disabled. The second is a P2S (Primary-to-Secondary) data path used for POSTing by the host. The third is a C2S (Core-to-Secondary) data path used for POSTing by the GE core.

Figure 20:
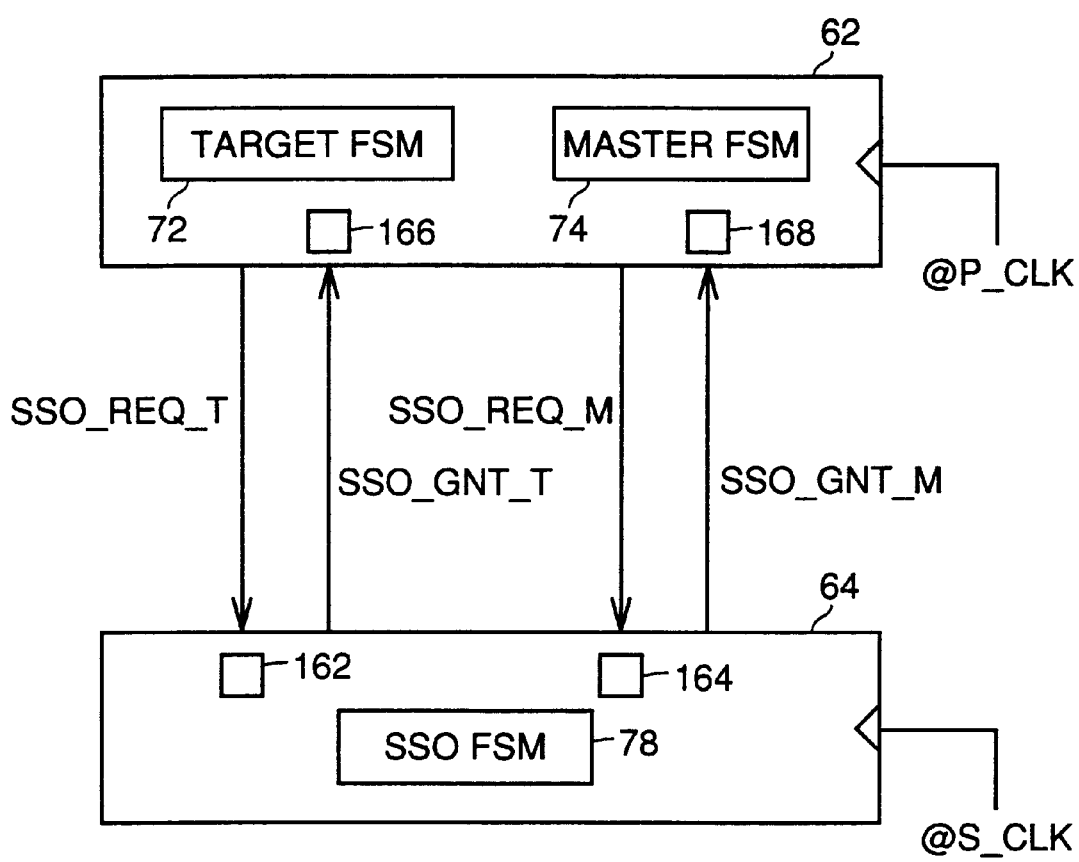
FIG. 20 shows asynchronous hand shaking of an FSM and an SSO FSM in a primary I/O.

Moreover, there are two independent sources for driving the primary AD lines. One is the host, and the other is the DMA. As shown in FIG. 20, the host refers to the target FSM 72 in primary I/O 62. The master FSM 74 in primary I/O 62 corresponds to the DMA. Since the primary FSM and secondary FSM, that is, the core are in a different clock domain, the SSO arbiter (SSO FSM) provided in the secondary I/O 62 has to deal with asynchronous hand shaking. Different frequencies are used for the primary and secondary PCI buses as mentioned above, as asynchronous approach is advantageous in view of speed of operation, as compared with the synchronous approach. Further, generally, clock frequency for secondary PCI bus operation is higher than that for the primary PCI bus.

In order to allow a smooth and well-balanced flow of the data in the PCI-PCI bridge, a special scheme, as described below, has been implemented.

More specifically, referring to FIG. 20, there are two asynchronous independent hand shakes between the SSO arbiter and the host and the DMA. In FIG. 20, for respective asynchronous hand shaking, synchronization points 162 and 166, and 164 and 168 are set. As can be seen from FIG. 20, primary I/O 62 is driven by a primary side clock @P_CLK, while the SSO arbiter of the secondary I/O 64 is driven by the secondary side clock @S_CLK, respectively.

Hand shakes consist of a request signal from the primary state machines and a corresponding grant signal from the SSO arbiter. Since mainly write accesses to the primary target are taking place, and read accesses are mostly not that timing critical, the SSO arbiter is optimized for smooth and fast rotation among the data sources to the secondary PCI bus, mainly the two POSTing buffers.

Therefore, the SSO arbiter has to rotate between those sources without penalty due to synchronizing requests and grants. Thus, if the core and a host compete with each other, the data can be pumped out from the secondary PCI bus in extremely efficient manner.

Figure 21:
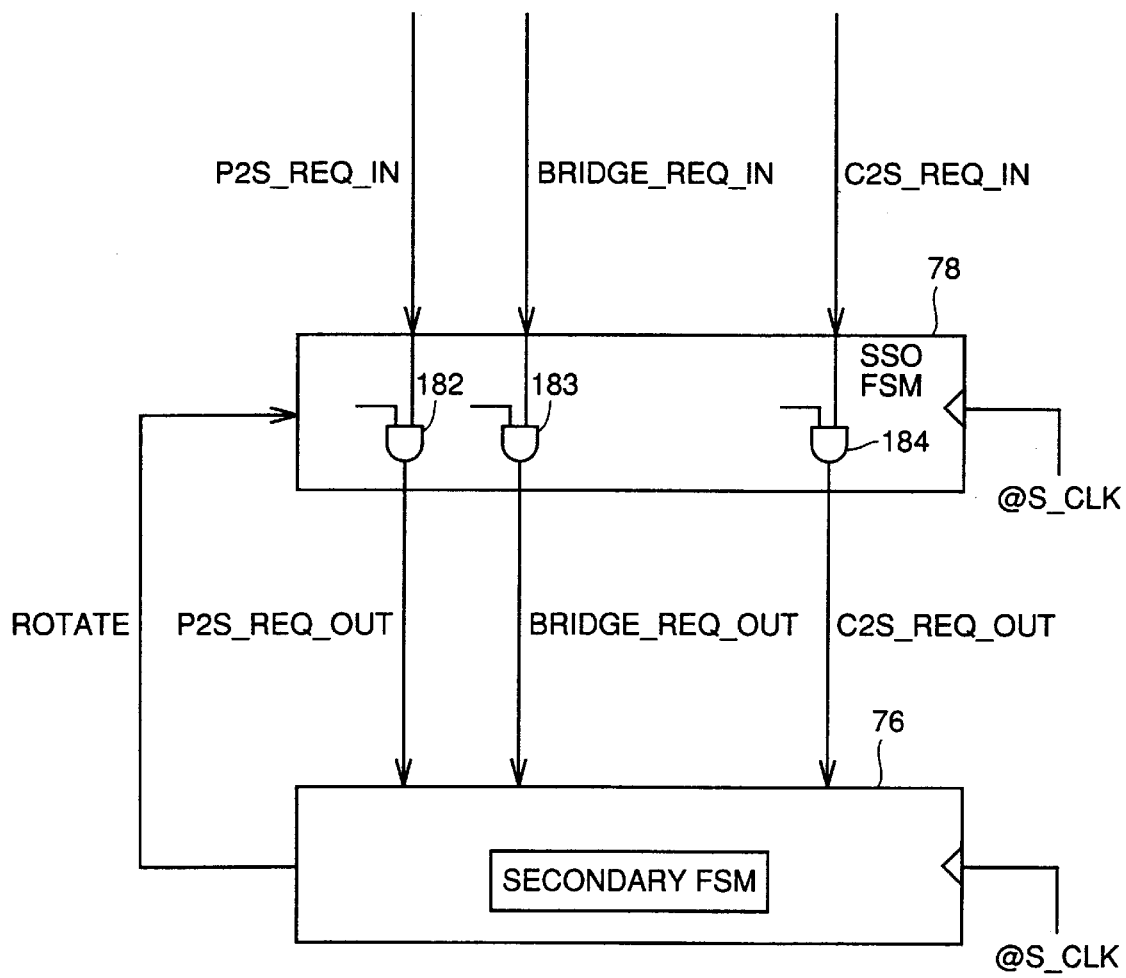
FIG. 21 shows relation of signal input/output between the SSO FSM and a secondary FSM.

Referring to FIG. 21, the SSO arbiter (SSO FSM) 78 has three request inputs and three request outputs. Depending on the state of SSO FSM itself, the SSO FSM will propagate one of the requests to the secondary FSM 76, or, if one of the primary FSMs is granted the permission to drive the AD lines, the arbiter will mask out all three requests to ensure that not both AD lines are driven simultaneously. For this purpose, a signal 'ROTATE' is applied from the secondary FSM 76 to SSO FSM 78. By an AND of the signal 'ROTATE' and each of the request signals (182, 183, 184), simultaneous driving of the two AD lines is avoided, as described above.

The signal 'ROTATE' shown in FIG. 21 is generated by the secondary FSM. This signal tells the SSO FSM to check whether a transition to the next state is to be made. The rotations are requested after every claimed cycle with data transfer on the secondary PCI bus. Hence, in case of a retry, no rotation is forced.

Figure 22:
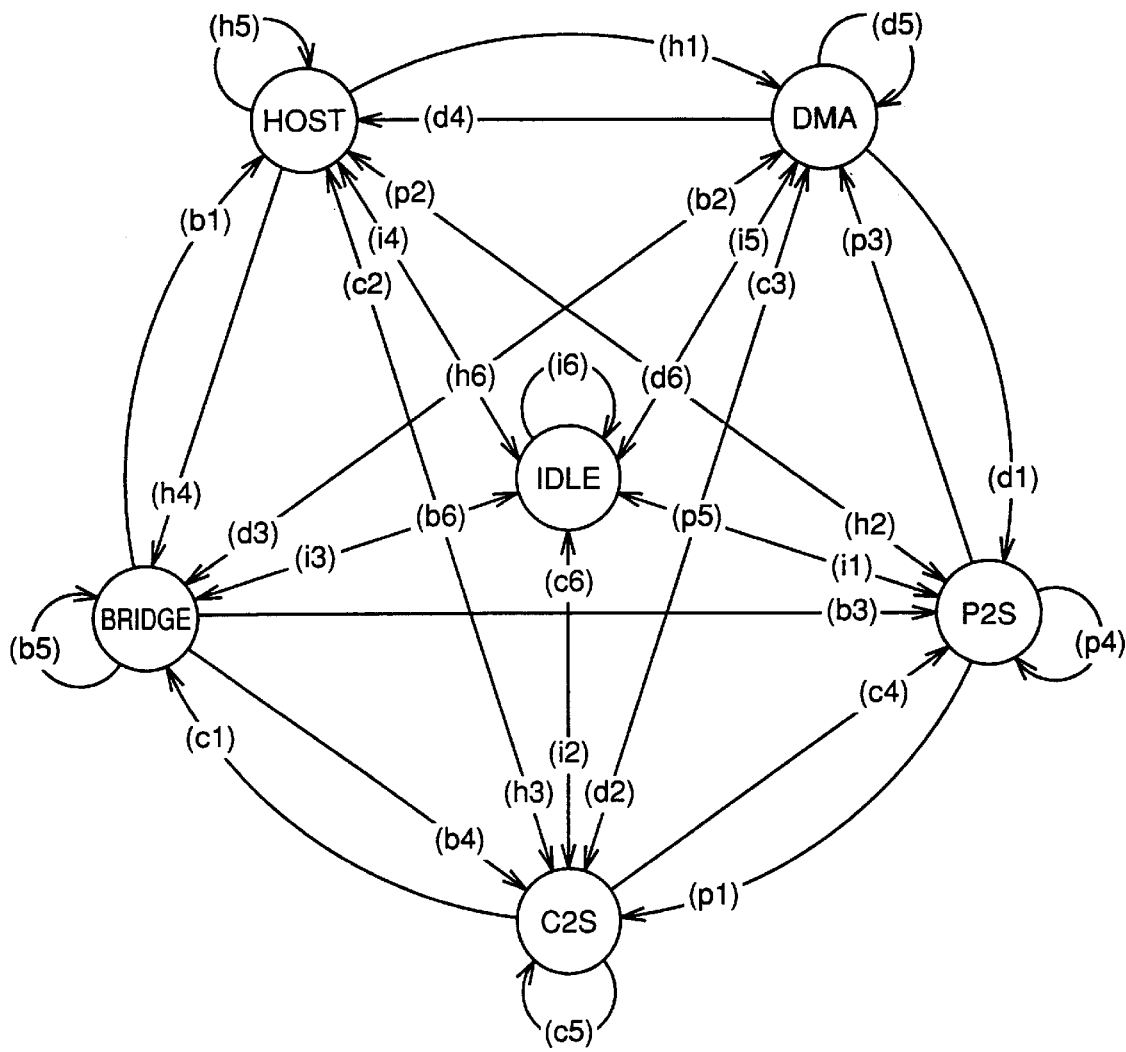
FIG. 22 is a state chart of the SSO FSM.

FIG. 22 is a state chart of the SSO FSM. In this figure, circles (HOST, DMA, P2S, C2S, BRIDGE, IDLE) indicate respective states, and arrows between the states represent transition between states made upon occurrence of an event. Reference characters in parentheses such as (b1, p2) on the arrows represent start points of transition and priority of transition. Start points of transition are represented by the reference characters shown in FIG. 22. The priority is determined so as to ensure "fair" granting of permission to drive AD lines when a plurality of requests are generated simultaneously. As for the number indicating priority, the lower the number, the higher the priority. By allocating appropriate priority to respective transitions, AD line permissions are fairly allocated to respective sources, enabling smooth data transfer.

Some examples of state transition by the SSO FSM shown in FIG. 22 will be described.

(1) If the SSO FSM is in the state 'IDLE' and simultaneous request from sources 'P2S' and 'C2S' are sensed, the transition 'i1' to the state 'P2S' and a transition 'i2' to the state 'C2S' are candidates. Of these, the former has higher priority, and hence transition 'i1' to the state 'P2S' takes place.

(2) If the SSO FSM is in the state 'BRIDGE', the SSO FSM is rotated and there are two simultaneous requests from the sources 'P2S' and 'HOST' at this very moment, a transition 'b1' to the state 'HOST' and a transition 'b3' to the state 'P2S' are possible. Here, the former has higher priority, and hence the transition 'b1' to the state 'HOST' takes place.

It should be noted that in FIG. 22, transitions of highest priorities are arranged clockwise on the outer periphery. This ensures "fair" rotation. It goes without saying that the example of FIG. 22 is not limiting. Any other state transition may be made provided that similar effects is ensured.

[Flow control]

Figure 23:
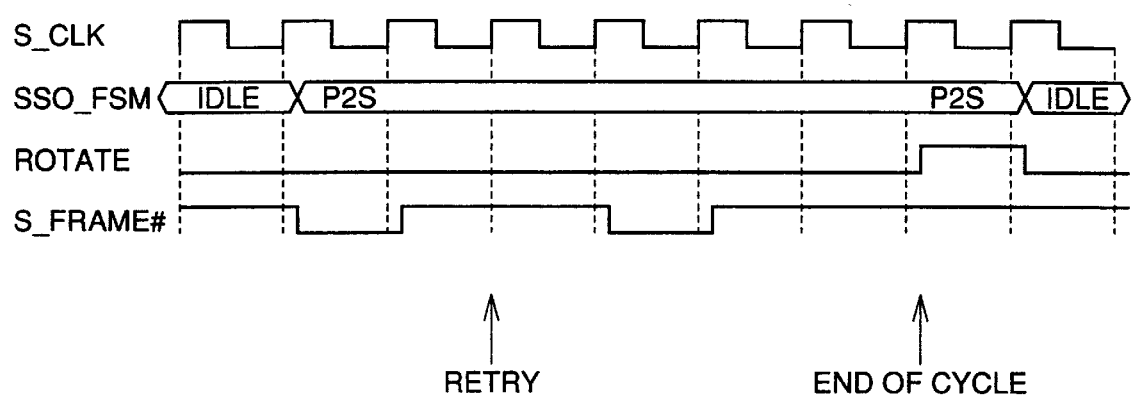
FIG. 23 is a diagram of waveforms when 'P2S' POSTing (power on self testing) is allowed continuously for a plurality of cycles.

In some cases, it may be inefficient to rotate after every concluded transaction. Accordingly, POSTing buffers 'P2S' and 'C2S' are customized to keep the permission to use AD lines for several transactions, even if another source request is active. FIG. 23 illustrates this approach.

For this purpose, the timing for activating the signal 'ROTATE' is controlled appropriately, as shown in FIG. 23. This signal indicates the end of successful data transmission, and is not activated in case of a retry. In the example shown in FIG. 23, the signal is not activated at the time point of retry but activated at the end of the cycle.

For a system supporting large bursts for memory writes, POSTing may be an efficient way to transfer data to the secondary PCI bus.

[P2S burst control]

Cycles triggered by a POSTing buffer are split on the secondary PCI bus according to the size of the memory banks. More specifically, if a 16 DWord burst is POSTed, it will be split into two 8 DWord cycles on the secondary PCI bus. By default, the SSO FMS would rotate after the first 8 DWords are written and another request is active. If only small blocks of data are POSTed, the SSO FSM would rotate, disregarding the number of DWords that were read. For example, when two 1 DWord cycles are POSTed, by default, the SSO FSM would rotate after the first DWord is written and another request is active.

In some cases, however, it may be desired to let the 'P2S' buffer carry out several cycles before rotating to another state. Therefore, the PCI-PCI bus in accordance with the present embodiment includes an MM PCI register 'P2S_Burst', which register controls the PCI-PCI bus. The value of the register determines the number of cycles the 'P2S' buffer is allowed to carry out before the SSO arbiter rotates.

Referring to FIG. 24A, for example, the POSTing data of 'P2S', for example, 16 DWords are split into two 8 DWords by default. Therefore, there is a time gap between these two 8 DWords. If a low latency for 'P2S' POSTing data is desired, high priority can be assigned to the POSTing buffer via the register 'P2S_Burst'. More specifically, referring to FIG. 24B, if the register 'P2S_Burst' is set to "2", the POSTing buffer of 'P2S' can continue writing out the final data (two) on the secondary PCI bus at one time, without giving up the permission for driving the AD lines. This lowers latency for the 'P2S' POSTing data.

[C2S burst control]

Similar control is applicable to the 'C2S' POSTing buffer. Though two memory banks are assumed for 'P2S', the PCI-PCI bridge in accordance with the present embodiment assumes a 'C2S' POSTing buffer having four memory banks. The 'C2S' POSTing buffer differs from 'P2S' in this point and, in addition, it differs from the 'P2S' posting buffer in that it has a source which is called "GE core". The 'C2S' POSTing buffer includes dedicated data for the secondary PCI device, and it may be desired to transfer the whole data block at once, even if the data is spread over several memory banks. This control is possible by using the MM PCI register 'C2S_Burst' in the PCI-PCI bridge in accordance with the present embodiment. The register 'C2S_Burst' determines the number of cycles which the 'C2S' buffer is allowed to carry out before the SSO arbiter rotates.

Figures 25A, 25B:
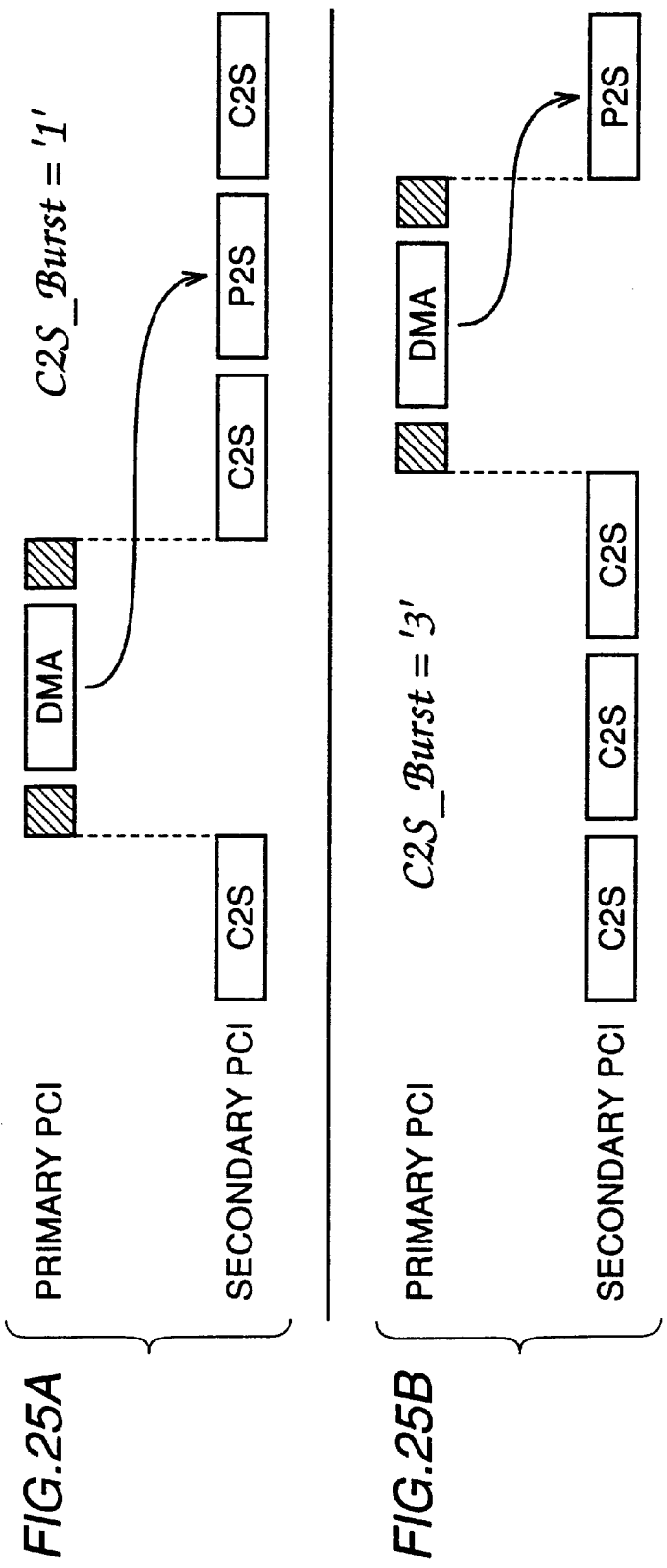
FIGS. 25A and 25B show a relation between a value of a 'C2S_Burst' register and data transfer timing.

Referring to FIG. 25A, for example, if the register 'C2S_Burst' is set to 1, the 'C2S' POSTing buffer must give up permission to drive AD lines at every cycle. If the register 'C2S_Burst' is set to 3, three continuous cycles are possible, as shown in FIG. 25B. As the number of cycles which can be carried out continuously by the 'C2S' POSTing buffer is controllable, data spreading over several memory block can collectively be transferred at one time from the GE core to the secondary PCI device.

[DMA burst control]

As mentioned earlier, the SSO arbiter is placed in the clock domain for the secondary PCI bus side. In other words, it operates in accordance with the clock signals for the secondary PCI bus. Therefore, it is necessary for the SSO arbiter to attain a full asynchronous hand shake for the DMA FSM. As a result, every time the 'DMA' state of the SSO FSM is entered or left, a synchronization penalty has to be taken into account.

If the DMA burst are very short, that is, if the host bridge only features a small buffer, the synchronization penalty increases the overall throughput delay. Therefore, it may be more efficient to let the DMA FSM do several bursts before rotating to the 'P2S' state. In the PCI-PCI bus in accordance with the present embodiment, this can be controlled by MM PCI register 'DMA_Burst'. The register 'DMA_Burst' determines the number of cycles the DMA FSM is allowed to carry out before it has to give up its request to the SSO arbiter.

Figure 26A:
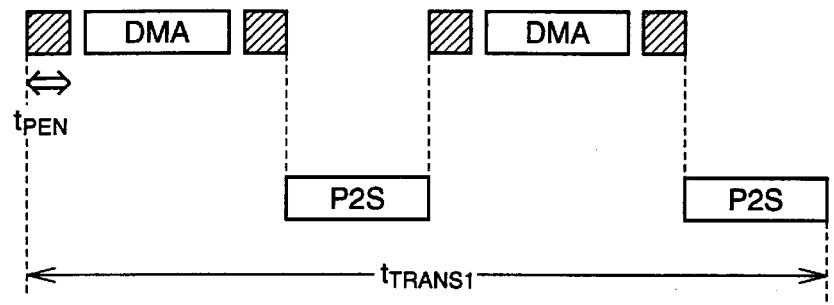
FIGS. 26A and 26B show a relation between a value of a 'DMA_Burst' register and data transfer timing.
Figure 26B:
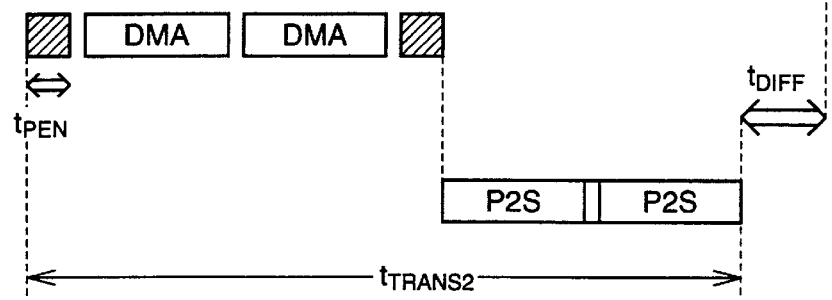

FIG. 26A shows a DMA transaction that is disconnected by the 'HOST'. In this case, the DMA FSM has to issue an additional cycle. This increases the overall latency of the DMA transaction by twice the synchronization penalty (represented by the hatching in FIGS. 26A and 26B) (if 'DMA_Burst' is set to 1). If 'DMA_Burst' is set to 2, however, the synchronization penalty is minimized and overall processing time can be reduced by the period represented as t diff in FIGS. 26A and 26B.

[Parameterizing POSTing FIFOs]

The 'P2S' POSTing buffer, the 'C2S' POSTing buffer and so on described above are comprised of FIFOs. The design of POSTing FIFOs is mostly a compromise between available area, required throughput and maximum latency. These conditions determine granularity of the FIFOs for POSTing transactions. Depending on the constraints given by the environment, it is very useful to have a wide range of possible architectures to choose FIFO implementation. Therefore, in the PCI-PCI bridge in accordance with the present embodiment, a parameterized FIFO design is utilized.

Figure 27:
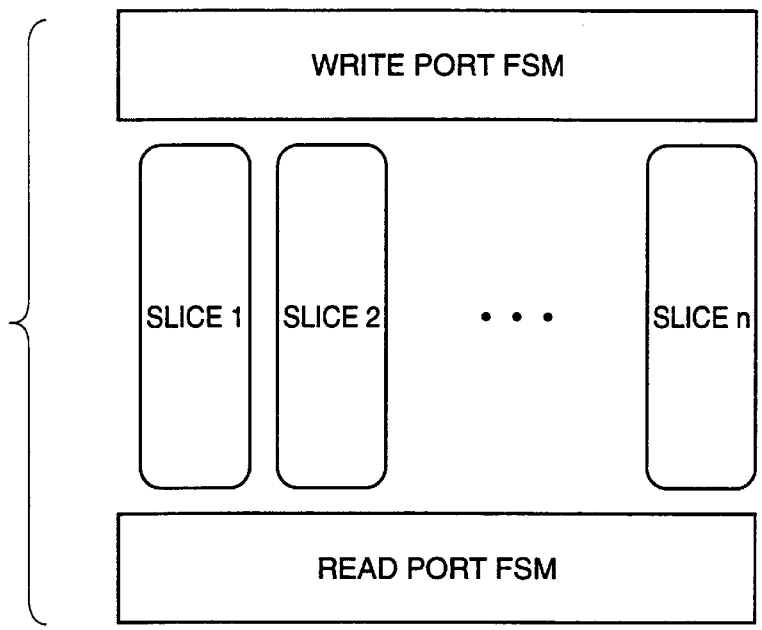
FIG. 27 schematically shows a configuration of a POSTing FIFO buffer in accordance with the present invention.

FIG. 27 shows a block diagram of a parameterized POSTing FIFO. Referring to FIG. 27, the POSTing FIFO includes a small read port FSM and a small write port FSM both for controlling the operation of the FIFO, and several "slices" interposed between these two FSMs. Several slices arranged in this manner build a fitting POSTing buffer.

Figure 28:
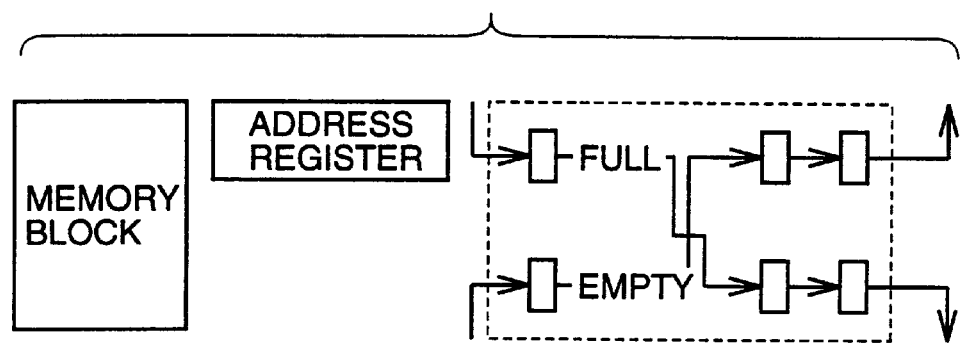
FIG. 28 shows configuration of a position slice in the POSTing FIFO.

Referring to FIG. 28, each "slice" consists of a memory bank with the size of nDWords for storing data, a 32-bit register for storing the corresponding (start) address, a "full" flag and an "empty" flag, and a fully asynchronous handshaking for the flags.

As the FIFO is formed to have a configuration having two FSMs with memory bank slices sandwiched therebetween, the POSTing FIFO can be conveniently customized by simply selecting the desired parameter, that is, the number of slices. When design is based on a hardware description language, for example, what is necessary is simply to change the parameter corresponding to the number of slices in accordance with the specification. This gives the designer flexibility for specification changes or revision of specification, and also significantly simplifies verification of several POSTing buffers.

Though the present invention has been described with reference to one specific embodiment, it is only an example, and the present invention is not limited to the specific embodiment. As described above, according to the present invention, by the PCI-PCI bridge not employing type "01" header, it is possible to connect a semiconductor integrated circuit device having a secondary PCI bus to a primary PCI bus, and to independently control individual PCI agent.

Further, a PCI-PCI bridge allowing connection between a primary PCI bus and a secondary PCI bus to which a VGA device and PCI agents are connected, is provided.

Further, according to the present invention, an error message at the time of boot-up can readily be given by an existing VGA device and, once the device driver is activated, processing using a PCI device is possible.

Further, according to the present invention, the PCI-PCI bridge allows efficient DMA transfer. Further, high speed data transfer is possible between the main memory and a PCI agent or an operation circuit for performing a specific operation on the secondary PCI bus.

Further, according to the present invention, the size of the FIFO is reduced to a parameter, and hence design change is readily possible. Therefore, design of a PCI-PCI bridge having an FIFO is facilitated.

Further, by the PCI-PCI bridge, data can be transferred at high speed with high efficiency, and the size of the first in first out memory used for data transfer can readily by changed. Therefore, design of the PCI-PCI bridge can readily be modified even if there is a specification change or a sudden design change. This shortens the time necessary for developing the device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A PCI-PCI bridge connected to a primary PCI bus and a secondary PCI bus, comprising
   connecting means for connecting said secondary PCI bus to said primary PCI bus, for controlling data transfer therebetween,
   said connecting means having a type "00" configuration header and including means for identifying, based on a value of a function number field of a configuration command from a device driver, at the time of configuration, one of a plurality of PCI agents on said secondary PCI bus and having the identified agent execute configuration.

2. The PCI-PCI bridge according to claim 1, wherein said plurality of PCI agents includes a VGA device and other PCI agents, and
   said connecting means is operable selectively in one of a first mode in which a memory map for the VGA device is active, and a second mode in which the PCI agents other than said VGA device are active.

3. The PCI-PCI bridge according to claim 2, wherein said connecting means is boot-up in said first mode, and switched to said second mode by a device driver operating on processing means connected to said primary PCI bus.

4. The PCI-PCI bridge according to claim 1, further comprising
   operating means for performing a specific operation and capable of data transfer between said primary PCI bus and said secondary PCI bus, wherein
   said connecting means manages data transmission/reception between said operating means and said primary PCI bus and said secondary PCI bus.

5. The PCI-PCI bridge according to claim 4, further comprising
   on the fly direct data transfer means responsive to triggering of direct data transfer from a main memory by the device driver, for performing designated data transfer thereafter without any intervention of the device driver, and responsive to a link list appended at a tail of a data block to be transferred, for performing a data transfer newly determined by said link list without any intervention of the device driver.

6. The PCI-PCI bridge according to claim 5, wherein said connecting means includes a state machine responsive to bus requests from a PCI agent on said primary PCI bus and an agent on said secondary PCI bus for arbitrating permission to drive said primary PCI bus and said secondary PCI bus so that not both of said primary PCI bus and said secondary PCI bus are driven simultaneously.

7. The PCI-PCI bridge according to claim 6, wherein said state machine operates in same clock domain as said secondary PCI bus.

8. The PCI-PCI bridge according to claim 7, wherein said state machine determines whether a state transition is to be made at every conclusion of transfer of a prescribed amount of data, and dependent on the result of determination, makes a state transition.

9. The PCI-PCI bridge according to claim 8, wherein said state machine allows setting of the amount of data transferred until determination as to whether a state transition is to be made larger in a specific state than in other states.

10. The PCI-PCI bridge according to claim 9, wherein said on the fly direct data transfer means can set up said state machine such that data transfer duration by itself is controlled.

11. The PCI-PCI bridge according to claim 6, wherein said on the fly direct data transfer means can set up said state machine such that data transfer duration by itself is controlled.

12. The PCI-PCI bridge according to claim 5, wherein said connecting means includes a first in first out memory interfacing data transfer between components operating at different clock frequencies,
   said first in first out memory including a write state machine for a write port,
   a read state machine for a read port, and
   a plurality of memory banks arranged in parallel between said write state machine and said read state machine.

13. The PCI-PCI bridge according to claim 1, further comprising on the fly direct data transfer means responsive to triggering of a direct data transfer from a main memory by a device driver, for performing a designated data transfer thereafter without any intervention by the device driver, and responsive to a link list appended at a tail of a data block to be transferred, for performing data transfer newly determined by said link list without any intervention by the device driver.

14. The PCI-PCI bridge according to claim 13, wherein said connecting means includes a first in first out memory for interfacing data transfer between components operating at different clock frequencies, said first in first out memory including a write state machine for a write port, a read state machine for a read port, and a plurality of memory banks arranged in parallel between said write state machine and said read state machine.

15. A PCI-PCI bridge connected to a primary PCI bus and a secondary PCI bus, comprising a bridge connecting said second PCI bus to said primary PCI bus, wherein said bridge has a type "00" configuration header and based on a value of a function number field of a configuration command from a device driver, at the time of configuration, identifies one of a plurality of PCI agents on said secondary PCI bus and lets the identified agent execute configuration.

16. The PCI-PCI bridge according to claim 15, wherein said plurality of PCI agents include a VGA device and other PCI agents, and said bridge is operable selectively in one of a first mode in which a memory map for the VGA device only is active, and a second mode in which PCI agents other than said VGA device are active.

17. The PCI-PCI bridge according to claim 16, wherein said bridge is boot-up in said first mode and switched to said second mode by a device driver operating on a processor connected to said primary PCI bus.

18. The PCI-PCI bridge according to claim 17, further comprising an operation core for performing a specific operation and capable of data transfer between said primary PCI bus and said secondary PCI bus, wherein said bridge manages data transmission/reception between said operation core and said primary PCI bus and said secondary PCI bus.

19. The PCI-PCI bridge according to claim 18, further comprising an on the fly direct data transfer circuit responsive to triggering of direct data transfer from a main memory by a device driver, for performing a designated data transfer thereafter without any intervention by the device driver, and responsive to a link list appended at a tail of a data block to be transferred, for performing data transfer newly determined by said link list without any intervention by the device driver.

20. The PCI-PCI bridge according to claim 19, wherein said connecting means includes a first in first out memory interfacing data transfer between components operating at different clock frequencies, comprising a write state machine for a write port, a read state machine for a read port, and a plurality of memory banks arranged in parallel between said write state machine and said read state machine.

* * * * *

UNITED STATES PATENT AND TRADEMARK OFFICE
CERTIFICATE OF CORRECTION

PATENT NO. : 6,272,582 B1  
DATED : August 07, 2001  
INVENTOR(S) : Robert Streitenberger et al.

Page 1 of 1

It is certified that error appears in the above-identified patent and that said Letters Patent is hereby corrected as shown below:

<u>Title page,</u>  
Under Section [56], References Cited, please add -- 196 03 850 08/1997 (DE) --

Signed and Sealed this

Seventh Day of May, 2002

*Attest:*

*Attesting Officer*

JAMES E. ROGAN  
*Director of the United States Patent and Trademark Office*